United States Patent
Misumi et al.

(10) Patent No.: US 10,239,062 B2
(45) Date of Patent: Mar. 26, 2019

(54) MILL AND BEVERAGE PREPARATION APPARATUS INCLUDING THE SAME

(71) Applicant: Sharp Kabushiki Kaisha, Osaka-shi, Osaka (JP)

(72) Inventors: Masaru Misumi, Osaka (JP); Hidekazu Shima, Osaka (JP); Takeshi Sawada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 334 days.

(21) Appl. No.: 14/909,201

(22) PCT Filed: Aug. 4, 2014

(86) PCT No.: PCT/JP2014/070445
§ 371 (c)(1),
(2) Date: Feb. 1, 2016

(87) PCT Pub. No.: WO2015/019986
PCT Pub. Date: Feb. 12, 2015

(65) Prior Publication Data
US 2016/0184830 A1    Jun. 30, 2016

(30) Foreign Application Priority Data

Aug. 5, 2013 (JP) .................................. 2013-162478
Jan. 31, 2014 (JP) .................................. 2014-016472

(51) Int. Cl.
*B02C 7/13* (2006.01)
*B02C 7/12* (2006.01)
(Continued)

(52) U.S. Cl.
CPC ................. *B02C 7/12* (2013.01); *A47J 31/42* (2013.01); *A47J 42/16* (2013.01); *B02C 7/13* (2013.01); *B02C 7/184* (2013.01)

(58) Field of Classification Search
CPC .. A47J 31/42; A47J 42/16; B02C 7/02; B02C 7/12; B02C 7/13; B02C 7/184; D21D 1/303; D21D 1/306; Y10T 29/49194
(Continued)

(56) References Cited

U.S. PATENT DOCUMENTS

| 1,705,379 A | * | 3/1929 | Sheppard, Jr. | ............ B02C 7/12 241/296 |
| 1,778,860 A | * | 10/1930 | Lindenfelser | ............ B02C 7/13 241/298 |

(Continued)

FOREIGN PATENT DOCUMENTS

| CN | 2608125 Y | 3/2004 |
| JP | 51-39268 A | 4/1976 |

(Continued)

OTHER PUBLICATIONS

Official Communication issued in corresponding Japanese Patent Application No. 2015-530872; dated Feb. 28, 2017.
(Continued)

*Primary Examiner* — Dana Ross
*Assistant Examiner* — Joe E Mills, Jr.
(74) *Attorney, Agent, or Firm* — Keating & Bennett, LLP

(57) ABSTRACT

In a mill having a first mill provided with a first grinding surface and a second mill provided with a second grinding surface, the first grinding surface includes a first groove in a curved shape which extends from a side of a center of rotation C toward an outer circumference, the second grinding surface includes a second groove in a curved shape which extends from the side of the center of rotation C toward the outer circumference, and while the first grinding surface and the second grinding surface are superimposed on each other, the first groove and the second groove are not superimposed on each other and an angle (an angle of
(Continued)

intersection) β at which the first groove and the second groove intersect with each other is 10°≤β≤50°.

13 Claims, 41 Drawing Sheets

(51) Int. Cl.
    *B02C 7/18*           (2006.01)
    *A47J 31/42*         (2006.01)
    *A47J 42/16*         (2006.01)

(58) Field of Classification Search
    USPC .......... 99/286; 241/157, 261.1, 261.2, 261.3, 241/298
    See application file for complete search history.

(56) References Cited

U.S. PATENT DOCUMENTS

| | | | | |
|---|---|---|---|---|
| 2,119,768 A * | 6/1938 | Anthony | B02C 7/12 | 241/261 |
| 3,589,630 A * | 6/1971 | Danforth | D21D 1/22 | 241/260 |
| 3,674,217 A * | 7/1972 | Reinhall | D21D 1/30 | 241/21 |
| 3,746,062 A * | 7/1973 | Nystrom | B27G 13/00 | 144/176 |
| 3,761,027 A * | 9/1973 | Mendoza | B02C 7/12 | 241/261.3 |
| 3,880,368 A * | 4/1975 | Matthew | D21D 1/30 | 241/102 |
| 4,023,737 A * | 5/1977 | Leider | B02C 7/12 | 241/261.3 |
| 4,023,739 A * | 5/1977 | Lampe | B22D 23/10 | 148/328 |
| 4,034,921 A * | 7/1977 | Schnitzer | B02C 7/02 | 241/157 |
| 4,676,440 A * | 6/1987 | Perkola | B02C 7/12 | 241/261.3 |
| 4,754,935 A * | 7/1988 | Gullichsen | D21D 1/22 | 162/28 |
| 4,874,136 A * | 10/1989 | Webster | B02C 2/10 | 241/251 |
| 4,889,428 A * | 12/1989 | Hodson | B01F 7/0085 | 241/253 |
| 5,046,672 A * | 9/1991 | Demler | B02C 7/12 | 241/296 |
| 5,373,995 A * | 12/1994 | Johannson | B02C 7/12 | 241/17 |
| 5,383,617 A * | 1/1995 | Deuchars | B02C 7/12 | 241/261.2 |
| 5,425,508 A * | 6/1995 | Chaney | B02C 7/12 | 241/261.2 |
| 5,439,183 A * | 8/1995 | Virving | B02C 7/12 | 241/261.3 |
| 5,597,127 A * | 1/1997 | Brown | B02C 13/205 | 241/188.2 |
| 5,687,922 A * | 11/1997 | Takaoka | A47J 42/06 | 241/259 |
| 5,863,000 A * | 1/1999 | Gingras | B02C 7/12 | 241/261.2 |
| 5,893,525 A * | 4/1999 | Gingras | D21D 1/306 | 241/261.3 |
| 6,042,036 A * | 3/2000 | Virving | B02C 2/10 | 162/234 |
| 6,095,032 A * | 8/2000 | Barnett | A47J 31/404 | 100/145 |
| 6,276,622 B1 * | 8/2001 | Obitz | B02C 7/12 | 241/261.3 |
| 6,311,907 B1 * | 11/2001 | Gingras | B02C 7/12 | 241/261.3 |
| 6,402,067 B1 * | 6/2002 | Webster | B02C 7/02 | 241/261.3 |
| 6,935,589 B1 * | 8/2005 | Matthew | B02C 7/12 | 241/261.3 |
| 7,273,005 B2 * | 9/2007 | Turi | A47J 31/42 | 99/275 |
| 8,945,346 B2 * | 2/2015 | Bjoerkqvist | D21D 1/20 | 162/187 |
| 2003/0071153 A1 * | 4/2003 | Aikawa | D21D 1/20 | 241/246 |
| 2004/0149844 A1 * | 8/2004 | Antensteiner | B02C 7/12 | 241/298 |
| 2005/0279219 A1 * | 12/2005 | Turi | A47J 31/42 | 99/286 |
| 2006/0006264 A1 * | 1/2006 | Sabourin | B02C 7/12 | 241/261.2 |
| 2006/0113415 A1 * | 6/2006 | Antensteiner | B02C 2/10 | 241/298 |
| 2006/0138256 A1 * | 6/2006 | Horigane | B02C 7/02 | 241/23 |
| 2006/0202074 A1 * | 9/2006 | Virving | B02C 7/12 | 241/261.2 |
| 2008/0025814 A1 * | 1/2008 | Raymond | B02C 7/12 | 411/354 |
| 2008/0296419 A1 * | 12/2008 | Gingras | D21D 1/30 | 241/28 |
| 2009/0140084 A1 * | 6/2009 | Horigane | B02C 7/13 | 241/6 |
| 2010/0210804 A1 * | 8/2010 | Guntherberg | B02C 2/10 | 526/319 |
| 2012/0032010 A1 * | 2/2012 | Ghibellini | D21D 1/306 | 241/244 |
| 2012/0032011 A1 * | 2/2012 | Ruola | B02C 7/12 | 241/277 |
| 2012/0138721 A1 * | 6/2012 | Hergesell | A47J 31/42 | 241/277 |
| 2012/0267459 A1 * | 10/2012 | Beirakh | B02C 7/06 | 241/27 |
| 2012/0294725 A1 * | 11/2012 | Hackl | B02C 18/086 | 416/223 R |
| 2013/0015281 A1 * | 1/2013 | Gingras | D21D 1/306 | 241/296 |
| 2013/0270377 A1 * | 10/2013 | Gingras | D21B 1/26 | 241/220 |
| 2013/0306770 A1 * | 11/2013 | Sjostrom | D21D 1/22 | 241/245 |
| 2015/0040946 A1 * | 2/2015 | Hofmann | B29B 17/02 | 134/10 |
| 2015/0201785 A1 * | 7/2015 | Taniwaki | A47J 19/00 | 241/24.26 |

FOREIGN PATENT DOCUMENTS

| | | |
|---|---|---|
| JP | 60-106547 A | 6/1985 |
| JP | 64-001734 U | 1/1989 |
| JP | 3-13887 B2 | 2/1991 |
| JP | 04-118142 U | 10/1992 |
| JP | 2001-275843 A | 10/2001 |
| JP | 2004-118680 A | 4/2004 |
| JP | 2005-199242 A | 7/2005 |
| JP | 2005-523155 A | 8/2005 |
| RU | 2 304 022 C2 | 8/2007 |
| UA | 68976 U | 4/2012 |
| UA | 98588 C2 | 5/2012 |

OTHER PUBLICATIONS

Kamei, S.; "Funsai"; Sangyo Tosho Kabushiki Kaisha; Jun. 1, 1952; pp. 196-206.

Official Communication issued in International Patent Application No. PCT/JP2014/070445, dated Oct. 21, 2014.

* cited by examiner

FIG.34
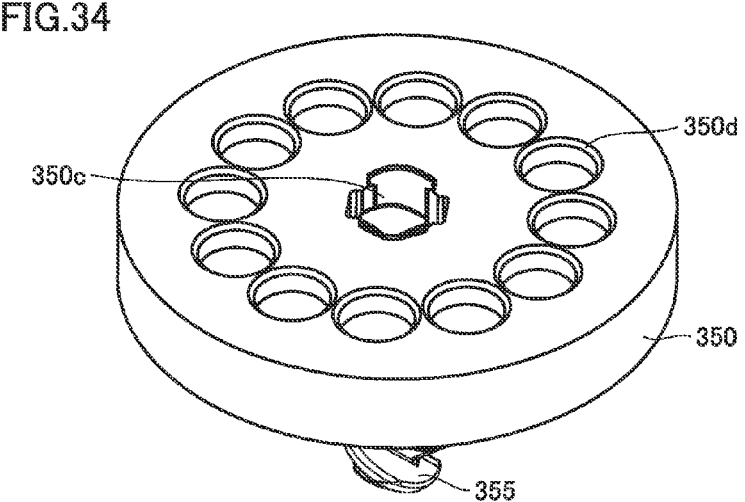
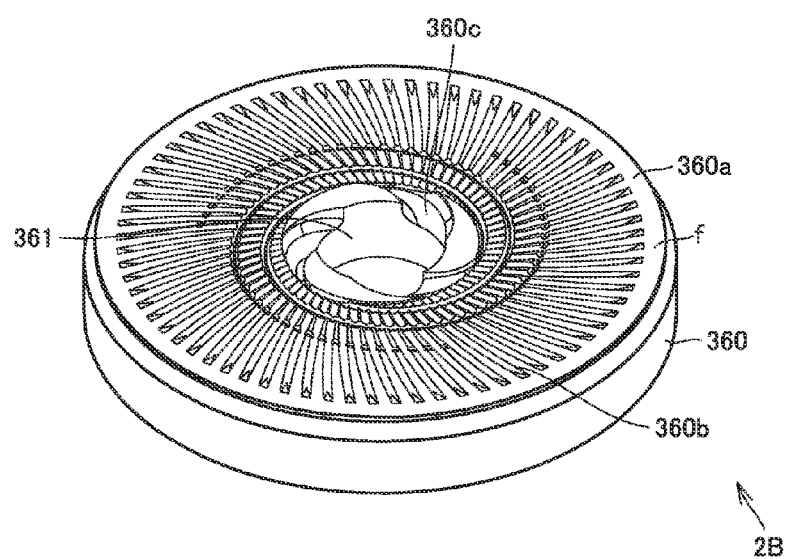

MILL AND BEVERAGE PREPARATION APPARATUS INCLUDING THE SAME

TECHNICAL FIELD

The present invention relates to a mill for obtaining powders by grating an object to be grated and a beverage preparation apparatus including the same.

BACKGROUND ART

A millstone has conventionally been used as means for grating tea leaves, grains, and other objects to be grated. The millstone is placed with a fixed lower mill and a rotating upper mill facing and being in contact with each other. An object guided to a gap between a grinding surface of the lower mill and a grinding surface of the upper mill from a portion around a center of rotation in an upper portion of the upper mill is pulverized as being grated by a flat portion and grooves provided in the grinding surfaces.

While the stonemill has traditionally been fabricated by working stones, some apparatuses in which such a traditional millstone is turned by electrically powered drive are available for a method of mass production of powders. On the other hand, a manual or electrically powered milling machine of a millstone type having a function comparable to the traditional millstone has been developed.

Japanese Patent Laying-Open No. 2005-199242 (PTD 1) discloses an electrically powered milling machine of a millstone type. This electrically powered milling machine has a shape of a mill like a traditional millstone (see FIG. 6 of the document).

Namely, in a surface (grinding surface) of a mill having a cylindrical outer shape, a plurality of grooves are formed in parallel at a prescribed pitch in each area resulting from division into eight parts around the center of rotation and a flat portion is provided in a portion other than the grooves. A portion of interest is grated by shear at an edge of the groove and by an effect of grinding at the flat portion as a result of abutment between an upper mill and a lower mill at the grinding surfaces and rotation of the upper mill and the lower mill relative to each other. Furthermore, PTD 1 discloses capability to suitably grate an object to be grated by setting a proportion of groove portions in opposing surfaces to be at least approximately twice as high as a proportion of the flat portion.

Japanese Patent Laying-Open No. 2001-275843 (PTD 2) discloses a tea dispenser which dispenses powder tea grated by an electrically powered milling machine of a millstone type. Here, a technique to provide a shutter preventing steam from entering a powder tea supply side and a technique to agitate powder tea in a storage portion are disclosed. A traditional shape of a mill is disclosed for grating of tea leaves as in PTD 1.

CITATION LIST

Patent Document

PTD 1: Japanese Patent Laying-Open No. 2005-199242
PTD 2: Japanese Patent Laying-Open No. 2001-275843

SUMMARY OF INVENTION

Technical Problem

It has been found that it is difficult to grate an object to be grated into a desired grain size when an area of a grinding surface of a mill is decreased with a shape of grooves adopted in the mill disclosed in the prior art described above being maintained.

This invention was made to solve the problem above, and provides a mill having a shape of a groove allowing reduction in size of a mill and a beverage preparation apparatus including the same.

Solution to Problem

One aspect of a mill based on this invention is directed to a mill having a first mill provided with a first grinding surface and a second mill provided with a second grinding surface, the first grinding surface includes a first groove in a curved shape which extends from a side of a center of rotation toward an outer circumference, the second grinding surface includes a second groove in a curved shape which extends from the side of the center of rotation toward the outer circumference, and the first groove and the second groove are not superimposed on each other and an angle (angle of intersection) $\beta$ between the first groove and the second groove is $10° \leq \beta \leq 50°$ while the first grinding surface and the second grinding surface are superimposed on each other.

In another form, the first groove has a shape extending along an equiangular spiral and an angle $\alpha 1$ formed between a half line extending from the center of rotation and the first groove is $0° < \alpha 1 < 45°$, and the second groove has a shape extending along an equiangular spiral and angle $\alpha 1$ formed between the half line extending from the center of rotation and the second groove is $0° < \alpha 1 < 45°$.

In another form, a plurality of second grooves are provided in rotation symmetry with respect to the center of rotation, the second groove further includes one branch portion or a plurality of branch portions and a third groove extending from the branch portion toward an outer circumferential portion, and the third groove extending from the branch portion toward the outer circumferential portion is arranged in rotation symmetry between the second grooves and curved in a direction the same as the second groove.

In another form, the third groove is provided with the branch portion at a position satisfying $0.2 \times D1 \leq dX \leq 0.6 \times D1$, where D1 represents an outer diameter of the second mill and dX represents a diameter of a circle having the center of rotation as an origin.

In another form, the first mill and/or the second mill further include(s) a plurality of fourth grooves provided in rotation symmetry with respect to the center of rotation, and an angle $\alpha 2$ formed between the half line extending from the center of rotation and the fourth groove is $45° < \alpha 2 < 90°$.

In another form, the first mill and/or the second mill further include(s) a side surface in a cylindrical shape which defines in a central portion, an inlet port through which an object to be grated is introduced, and an intake groove opening into the grinding surface from the side surface, a plurality of intake grooves are provided in rotation symmetry with respect to the center of rotation, the intake groove has an inclined surface increasing in depth toward the center of rotation, and the intake groove corresponds to the fourth groove in number and has a terminal end coinciding with a starting point of the fourth groove. In another form, a condition of $d6 \leq 0.5 \times D1$ and $dE \leq 0.9 \times D1$ is satisfied, where D1 represents an outer diameter of the first mill, d6 represents a diameter of the terminal end of the intake groove, and dE represents a diameter of the terminal end of the fourth groove, the intake groove is arranged in a region lying between the side surface and d6, and the fourth groove is arranged in a region lying between the side surface and the diameter of the terminal end of the fourth groove.

In another form, a flat portion where no first groove is present is provided around an entire circumference of an outermost circumferential portion of the first grinding surface, a flat portion where no second groove is present is provided around an entire circumference of an outermost circumferential portion of the second grinding surface, a width w of the fourth groove along a direction orthogonal to a direction of extension of the fourth groove is within a range of 0.3 mm≤w≤1.5 mm, the fourth groove has an inclined surface increasing in depth toward the center of rotation, a depth d from the first grinding surface at the terminal end of the fourth groove is within a range of 0.1 mm≤d≤2 mm, and an angle of inclination θ of the inclined surface with respect to the first grinding surface is within a range of 0°≤θ≤4.5°.

In another form, the first groove has a width w along a direction orthogonal to a direction of extension of the first groove within a range of 0.3 mm≤w≤1.5 mm, has an inclined surface increasing in depth toward the center of rotation, has a depth d from the first grinding surface on an outermost circumferential side of the inclined surface within a range of 0.1 mm≤d≤1 mm, and has an angle of inclination θ of the inclined surface with respect to the first grinding surface of 0°≤θ≤4.5°, the second groove has width w along a direction orthogonal to a direction of extension of the second groove within a range of 0.3 mm≤w≤1.5 mm, has an inclined surface increasing in depth toward the center of rotation, has depth d from the second grinding surface on the outermost circumferential side of the inclined surface within a range of 0.1 mm≤d≤1 mm, and has angle of inclination θ of the inclined surface with respect to the second grinding surface of 0°≤θ≤4.5°, and the third groove has width w along a direction orthogonal to a direction of extension of the third groove within a range of 0.3 mm≤w≤1.5 mm, has an inclined surface increasing in depth toward the center of rotation, and has depth d from the second grinding surface on the outermost circumferential side of the inclined surface within a range of 0.1 mm≤d≤1 mm.

A mill in another aspect based on this invention is directed to a mill having a first mill and a second mill each provided with a grinding surface, the grinding surface includes a groove extending from a center of rotation toward an outer circumference, and the groove has a shape extending along an equiangular spiral.

In another form of a milling machine, the groove has a plurality of first grooves provided in rotation symmetry with respect to the center of rotation, and an angle α1 formed between a half line extending from the center of rotation and the first groove is 0°<α1<45°.

In another form, the groove has a third groove provided in rotation symmetry with respect to the center of rotation, and an angle α2 formed between a half line extending from the center of rotation and the third groove is 45°<α2<90°.

In another form, a flat portion where no first groove is present is provided around an entire circumference of an outermost circumferential edge portion of the grinding surface, a width w along a direction orthogonal to a direction of extension of the first groove is within a range of 0.5 mm≤w≤1.5 mm, the first groove has an inclined surface increasing in depth toward the center of rotation, a depth d from the grinding surface on an outermost circumferential side of the inclined surface is within a range of 0.1 mm≤d≤1 mm, and an angle of inclination θ of the inclined surface with respect to the grinding surface is 2.3°≤θ≤4.5°.

A beverage preparation apparatus based on this invention is directed to a beverage preparation apparatus for preparing beverages with powders and includes a milling machine for obtaining the powders by grating an object to be grated, a tank for storing a liquid, and an agitation tank supplied with the powders obtained by the milling machine and the liquid, for mixing the powders and the liquid, and the milling machine includes any mill as described above. Another aspect of a mill based on this invention is directed to a mill having an upper mill and a lower mill each provided with a grinding surface, the grinding surface includes a linear groove extending from a center of rotation toward an outer circumference, a flat portion where no groove is present is provided around an entire circumference of an edge portion on an outermost circumferential side of the grinding surface, a width w along a direction orthogonal to a direction of extension of the groove is within a range of 0.5 mm≤w≤1.5 mm, the groove has an inclined surface increasing in depth toward the center of rotation, a depth d from the grinding surface on an outermost circumferential side of the inclined surface is within a range of 0.1 mm≤d≤1 mm, and an angle of inclination θ of the inclined surface with respect to the grinding surface is 2.3°≤θ≤4.5°.

In one aspect and other aspects, the mill has a diameter of 30 mm≤φ≤60 mm, and a relative rotation speed W of the upper mill and the lower mill is 60 rpm ≤W≤150 rpm.

In another form of a milling machine, a plurality of mills according to any of the above are provided and the plurality of mills are rotated by the same rotational drive apparatus.

In another form of a milling machine, a plurality of mills according to any of the above are provided and the plurality of mills are coaxially rotated.

In another form of a milling machine, a dispensing portion which stores the powders grated by the mill and a blade which rotates together with the mill are provided, the blade has the powders stored in the dispensing portion with rotation of the mill, and the powders are discharged from an opening provided below the dispensing portion.

In another form of a milling machine, the blade has a heat dissipation function.

Advantageous Effects of Invention

According to the present invention, a mill having a shape of a groove allowing reduction in size of a mill and a beverage preparation apparatus including the same can be provided.

BRIEF DESCRIPTION OF DRAWINGS

FIG. 34 is an exploded perspective view from a lower side of the core, the lower mill, and the upper mill in Embodiment 9.

DESCRIPTION OF EMBODIMENTS

Figure 1:
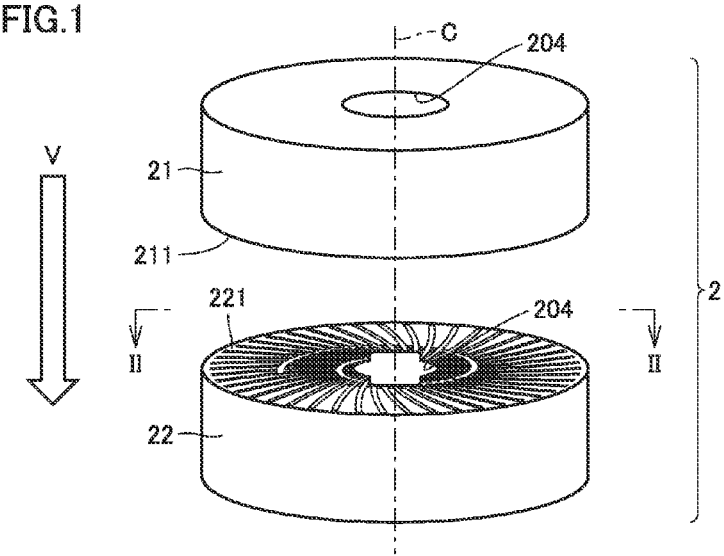
FIG. 1 is an overall view showing a structure of a mill in Embodiment 1.

A mill, a milling machine, and a beverage preparation apparatus in embodiments of the present invention will be described with reference to the drawings. In the drawings of each embodiment, the same or corresponding elements have the same reference numeral allotted and redundant description may not be repeated. When the number or an amount is mentioned in each embodiment, the scope of the present invention is not necessarily limited to the number or the amount unless otherwise specified.

(Embodiment 1: Mill 2)

A mill 2 in Embodiment 1 based on the present invention will be described with reference to FIGS. 1 to 3. FIG. 1 is an overall view showing a structure of mill 2 in the present embodiment, FIG. 2 is a diagram showing a shape of grooves provided in a grinding surface of a lower mill 22 in the present embodiment, viewed along the line II-II in FIG. 1, and FIG. 3 is a cross-sectional view along the line in III-III FIG. 2.

Referring to FIG. 1, mill 2 in the present embodiment includes an upper mill 21 provided with a grinding surface 211 and lower mill 22 provided with a grinding surface 221. Both of upper mill 21 and lower mill 22 have a disk shape. A center of rotation C is defined at a central portion of upper mill 21 and lower mill 22. Ceramics (alumina) is desirably employed as a material for upper mill 21 and lower mill 22.

Upper mill 21 and lower mill 22 in the present embodiment have a radius r approximately from 15 mm to 30 mm (a diameter ϕD1 being 30 mm≤ϕD1≤60 mm: see FIG. 3), and upper mill 21 and lower mill 22 have a thickness t1 around 8 mm. A relative rotation speed W of upper mill 21 and lower mill 22 is approximately 60 rpm≤W≤150 rpm. Thus, processing capability can be obtained based on a rotation speed in compensation for decrease in area of contact between the mills and reduction in necessary torque, and processing capability per necessary torque can thereby be enhanced rather than by increasing an area.

Figure 2:
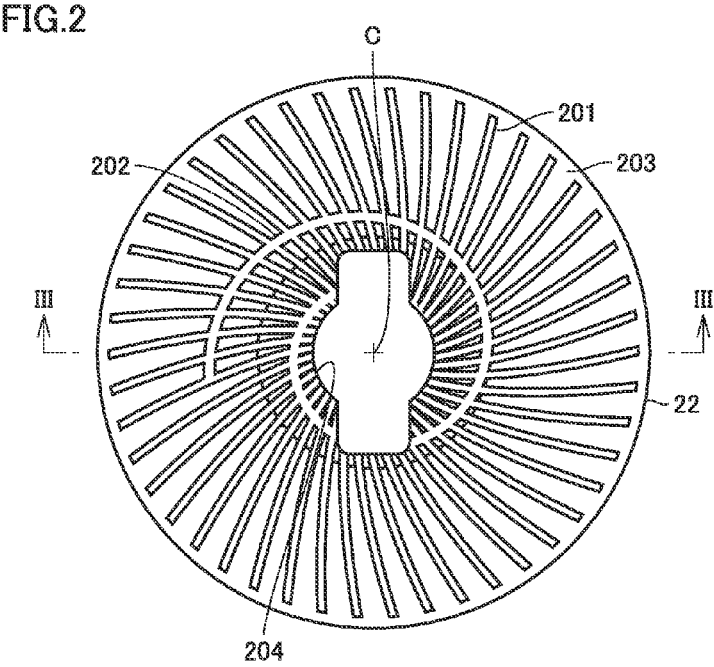
FIG. 2 is a diagram showing a shape of a groove provided in a grinding surface of a lower mill in Embodiment 1, viewed along the line II-II in FIG. 1.
Figure 3:
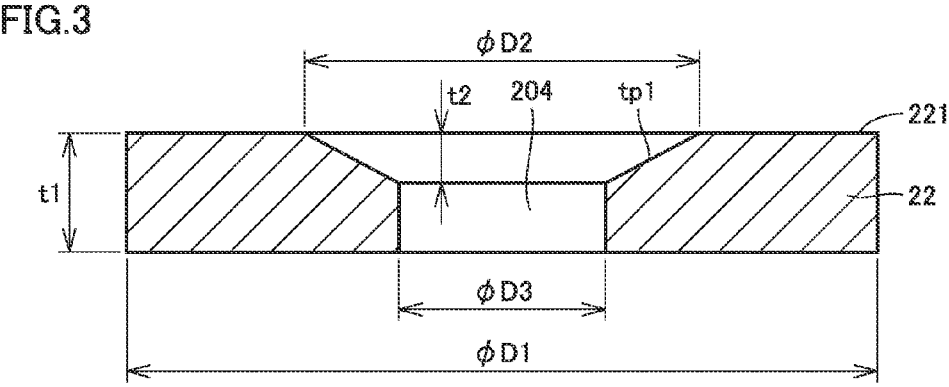
FIG. 3 is a cross-sectional view along the line in III-III in FIG. 2.

Referring to FIG. 2, a polished planar portion 203, a shear groove (second groove) 201, and a feed groove (fourth groove) 202 are formed in grinding surface 221 of lower mill 22. Similarly, polished planar portion 203, shear groove (first groove) 201, and feed groove (fourth groove) 202 are formed also in grinding surface 211 of upper mill 21.

As grinding surface 211 of upper mill 21 and grinding surface 221 of lower mill 22 are arranged to face each other, a groove provided in grinding surface 211 of upper mill 21 and a groove provided in grinding surface 221 of lower mill 22 are in relation of arrangement in point symmetry with respect to center of rotation C, when viewed along a direction shown with an arrow V in FIG. 1.

A plurality of shear grooves 201 are provided in rotation symmetry with respect to center of rotation C. Shear groove 201 is a groove for mainly grating an object to be grated and feed groove 202 is a groove for mainly feeding grated powders from a central portion of mill 2 to an outer circumferential portion.

A hole 204 including a key shape is opened in lower mill 22. Hole 204 has a diameter, for example, around 8 mm (ϕD3: see FIG. 3). Upper mill 21 is provided with hole 204 without a key shape.

Referring again to FIG. 1, grinding surface 221 of lower mill 22 and grinding surface 211 of upper mill 21 abut to each other and rotate relatively to each other with center of rotation C being defined as a center of an axis of rotation. In the present embodiment, lower mill 22 having hole 204 including a key shape rotates around a shaft 111 (see FIG. 19) which will be described later, whereas upper mill 21 is fixed.

Referring to FIG. 3, in grinding surface 221 of lower mill 22, a tapered region tp1 is provided to include hole 204. Tapered region tp1 has an outer diameter (ϕD2) around 20 mm and hole 204 has a depth t2 approximately from 2 mm to 3 mm. Similar tapered region tp1 is provided also in upper mill 21.

Grinding surface 221 of lower mill 22 and grinding surface 211 of upper mill 21 are superimposed on each other, so that a space surrounded by tapered region tp1 is formed. Thus, for example, even when tea leaves are introduced as an object to be grated, the tea leaves can satisfactorily be guided from this space to the grinding surface.

Figure 4:
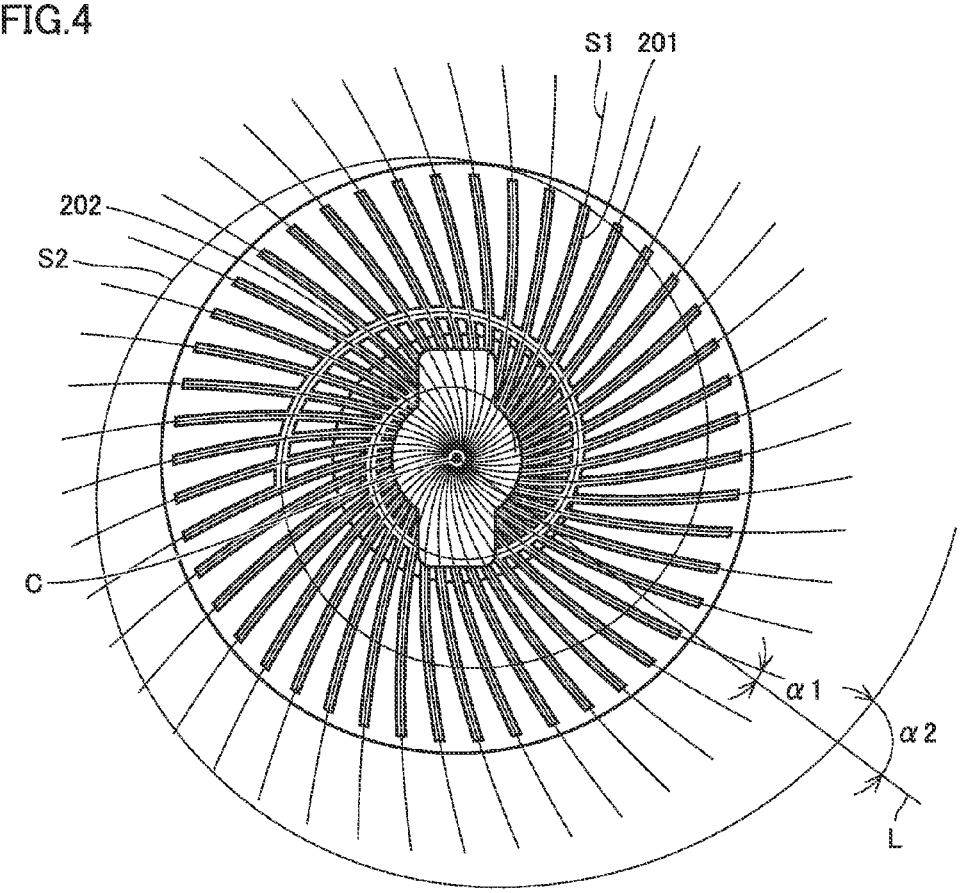
FIG. 4 is a diagram showing an equiangular spiral along which the shape of the groove extends in Embodiment 1.
Figure 5:
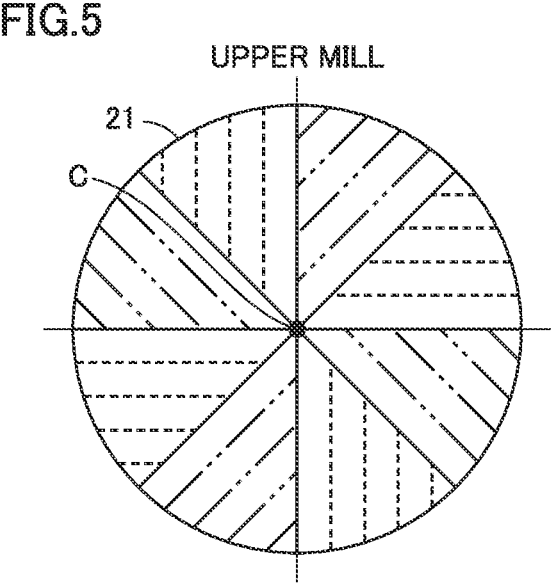
FIG. 5 is a view from above, which shows a shape of grooves provided in a grinding surface of an upper mill in the background art.
Figure 6:
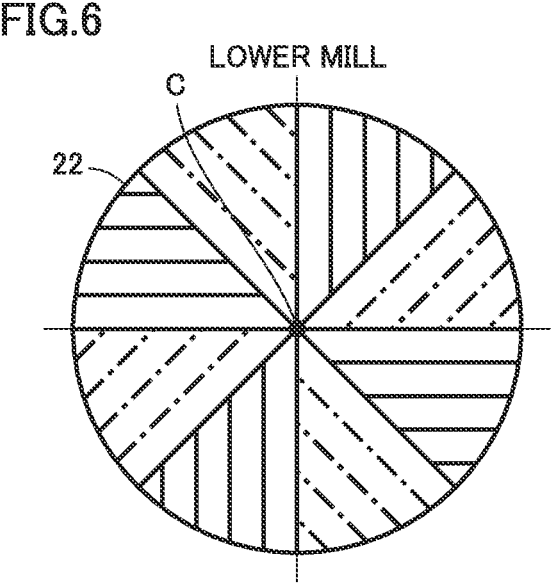
FIG. 6 is a view from above, which shows a shape of grooves provided in a grinding surface of a lower mill in the background art.
Figure 7:
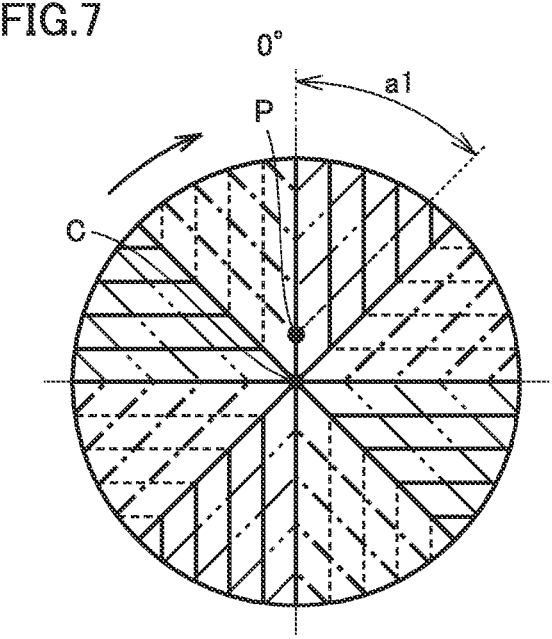
FIG. 7 is a view from above, which shows a state of the grinding surface including grooves provided in a mill in the background art, with an angle of rotation being set to 0°.
Figure 8:
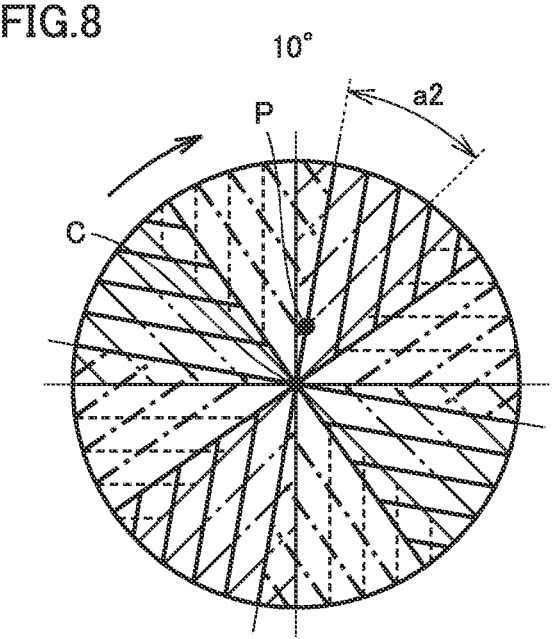
FIG. 8 is a view from above, which shows a state of the grinding surface including the grooves provided in the mill in the background art, with an angle of rotation being set to 10°.
Figure 9:
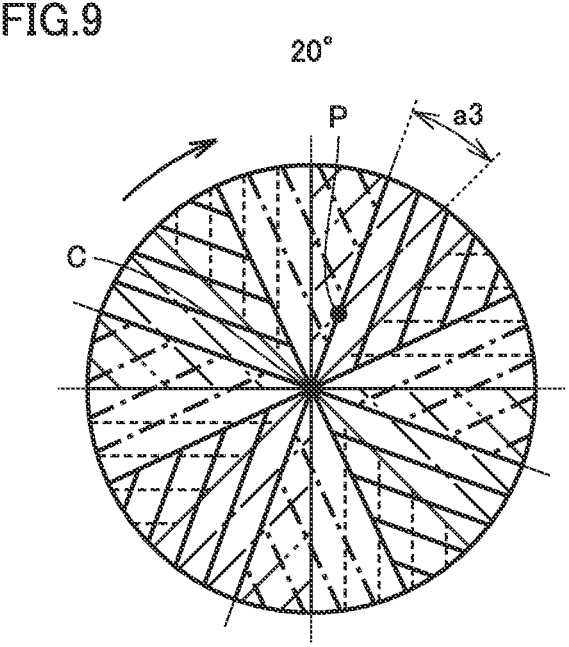
FIG. 9 is a view from above, which shows a state of the grinding surface including the grooves provided in the mill in the background art, with an angle of rotation being set to 20°.
Figure 10:
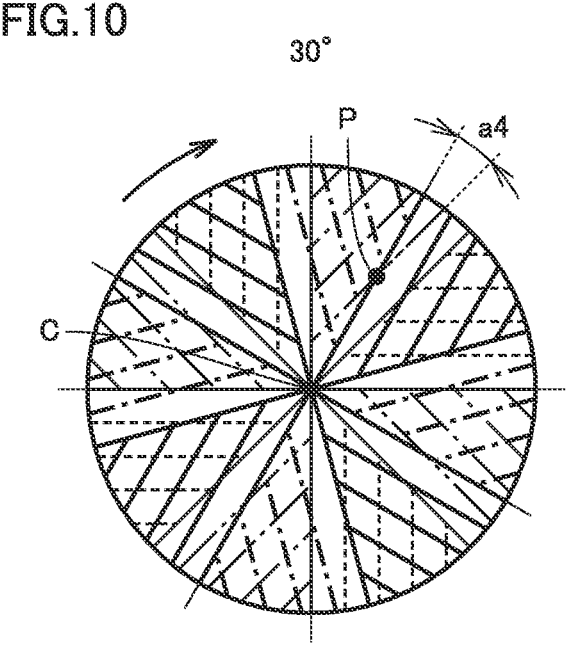
FIG. 10 is a view from above, which shows a state of the grinding surface including the grooves provided in the mill in the background art, with an angle of rotation being set to 30°.

An equiangular spiral along which shear groove 201 and feed groove 202 extend will be described with reference to FIGS. 4 to 16. FIG. 4 is a diagram showing an equiangular spiral along which the shape of the groove extends in the present embodiment, FIG. 5 is a view from above, which shows a shape of grooves provided in a grinding surface of an upper mill in the background art, and FIG. 6 is a view from above, which shows a shape of grooves provided in a grinding surface of a lower mill in the background art. The view from above means a view along a direction shown with arrow V in FIG. 1. FIGS. 7 to 10 are views from above, which show states of the grinding surface including grooves provided in a mill in the background art, with an angle of rotation being set to 0°, 10°, 20°, and 30°, respectively.

Figure 11:
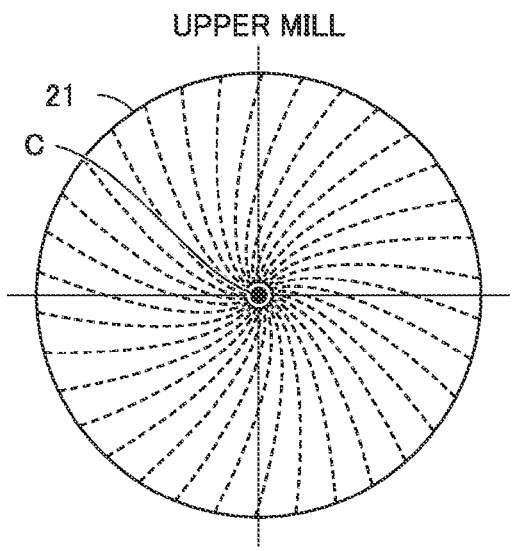
FIG. 11 is a view from above, which shows a shape of grooves provided in a grinding surface of the upper mill in Embodiment 1.
Figure 12:
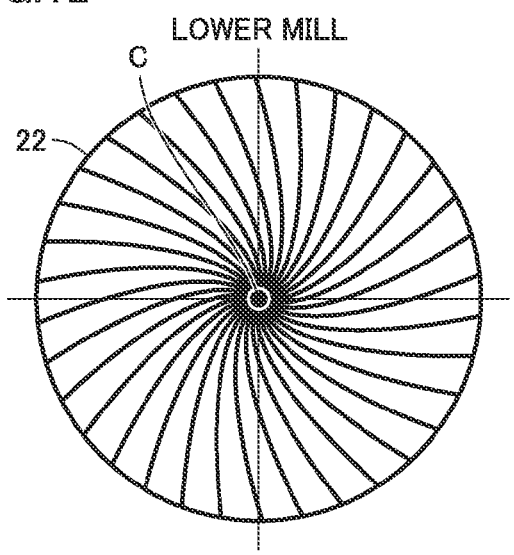
FIG. 12 is a view from above, which shows a shape of grooves provided in the grinding surface of the lower mill in Embodiment 1.
Figure 13:
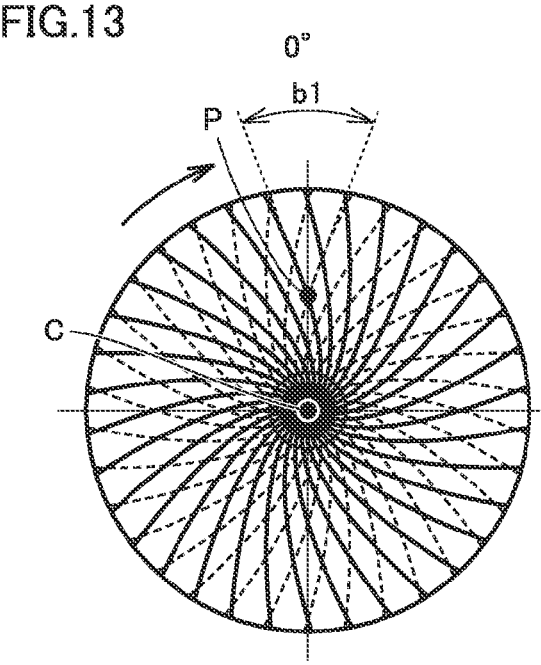
FIG. 13 is a view from above, which shows a state of the grinding surface including grooves provided in a mill in Embodiment 1, with an angle of rotation being set to 0°.
Figure 14:
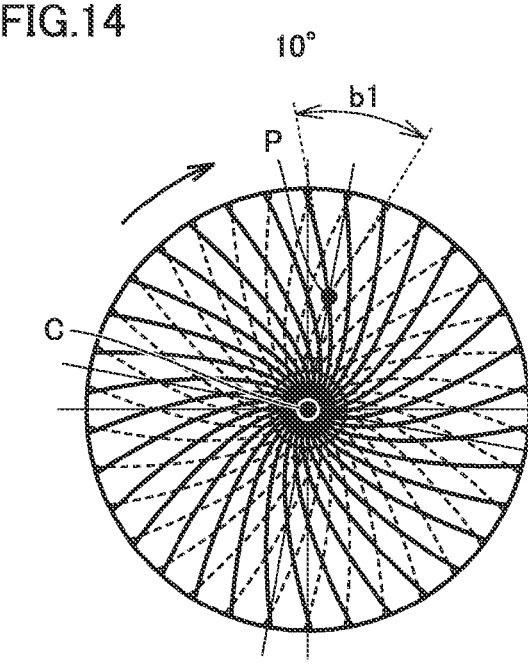
FIG. 14 is a view from above, which shows a state of the grinding surface including the grooves provided in the mill in Embodiment 1, with an angle of rotation being set to 10°.
Figure 15:
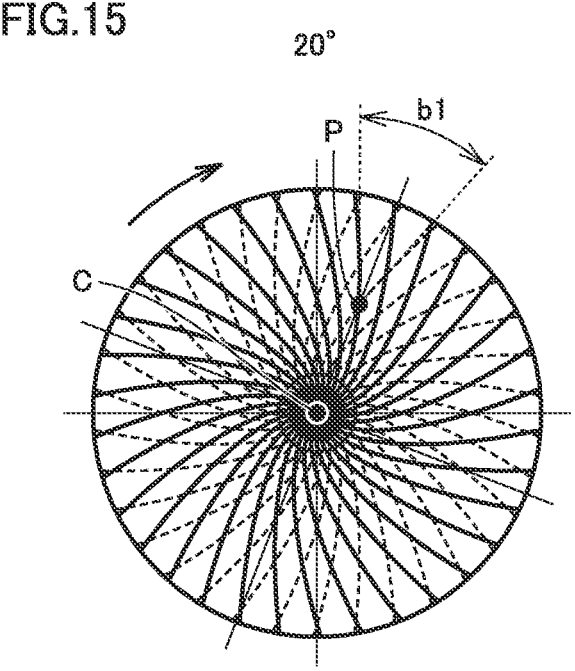
FIG. 15 is a view from above, which shows a state of the grinding surface including the grooves provided in the mill in Embodiment 1, with an angle of rotation being set to 20°.
Figure 16:
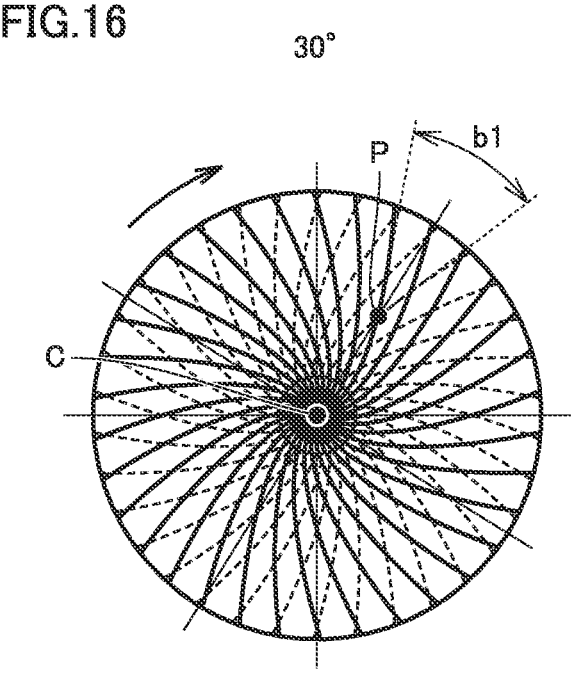
FIG. 16 is a view from above, which shows a state of the grinding surface including the grooves provided in the mill in Embodiment 1, with an angle of rotation being set to 30°.

FIG. 11 is a view from above, which shows a shape of grooves provided in the grinding surface of the upper mill in the present embodiment, and FIG. 12 is a view from above, which shows a shape of grooves provided in the grinding surface of the lower mill in the present embodiment. FIGS. 13 to 16 are views from above, which show states of the grinding surface including grooves provided in the mill in the present embodiment, with an angle of rotation being set to 0, 10°, 20°, and 30°, respectively.

Referring to FIG. 4, shear groove 201 is formed along an equiangular spiral S1, and feed groove 202 is formed along an equiangular spiral S2. With center of rotation C being defined as the origin, equiangular spiral S (S1 and S2) is expressed in an expression 1 below with parameters a and b.

$$S = a \cdot \exp(b19\,\theta) \qquad \text{(Expression 1)}$$

An angle α (α1 and α2) formed between a half line L extending from center of rotation C and an equiangular spiral is expressed in an expression 2 below.

$$\alpha = \operatorname{arccot}(b) \qquad \text{(Expression 2)}$$

Equiangular spiral S1 suitable for shear groove 201 is defined by a=5 and b=0.306 in (Expression 1) and α=17.0° in (Expression 2). In practice, angle α1 formed between half line L and equiangular spiral S1 (shear groove 201) is desirably 0°<α1<45°, preferably 10°≤α1≤20°, and further preferably α1=17.0°.

Equiangular spiral S2 suitable for feed groove 202 is defined by a=5 and b=3.7 in (Expression 1) and α=74.9° in (Expression 2). In practice, angle α2 formed between half line L and equiangular spiral S2 (feed groove 202) is desirably 45°<α2<90°, preferably 70°≤α2≤80°, and further preferably α2=74.9°.

Here, mathematic properties of an equiangular spiral expressed in (Expression 1) are that angles α formed between half line L extending from center of rotation C and equiangular spirals S1 and S2 are always constant. Therefore, when rotation is carried out with grinding surface 211 of upper mill 21 and grinding surface 221 of lower mill 22 abutting to each other, an angle of intersection between the groove (shear groove 201 and feed groove 202) in upper mill 21 and the groove (shear groove 201 and feed groove 202) in lower mill 22 is always 2α.

FIGS. 5 to 10 are schematic diagrams showing an angle of intersection between the grooves in upper mill 21 and lower mill 22 in the background art. FIGS. 7 to 10 show observation of the grinding surface from an upper surface of upper mill 21. With an initial state 0° (FIG. 7) being defined as the reference, rotation of upper mill 21 and lower mill 22 relative to each other by 10° (FIG. 8), 20° (FIG. 9), and 30° (FIG. 10) is shown.

An angle of intersection at a point of intersection P between the groove in upper mill 21 and the groove in lower mill 22 to which attention is paid here varies as gradually decreasing with increase in angle of rotation as shown with a1 to a4. In addition, point of intersection P moves outward. Therefore, shear of an object at the time of intersection between edges of the grooves and feed in a direction toward an outer circumference simultaneously proceed.

FIGS. 11 to 16 are schematic diagrams showing angles of intersection between the grooves in upper mill 21 and lower mill 22 in the present embodiment. FIGS. 13 to 16 show observation of the grinding surface from an upper surface of upper mill 21. With an initial state 0° (FIG. 13) being defined as the reference, rotation of upper mill 21 and lower mill 22 relative to each other by 10° (FIG. 14), 20° (FIG. 15), and 30° (FIG. 16) is shown.

An angle of intersection at point of intersection P between the groove in upper mill 21 and the groove in lower mill 22 to which attention is paid here is always constant at b1. In addition, an amount of movement of the point of intersection outward is smaller than an amount of movement in the background art shown in FIGS. 7 to 10. Therefore, by providing an appropriate angle of intersection, a desired shearing function can be provided at the time of intersection between the edges of the grooves.

Though a case that only shear groove 201 in FIG. 2 is illustrated is described with reference to FIGS. 11 to 16 for the sake of convenience of description, feed groove 202 formed along the equiangular spiral is also similar to shear groove 201.

Grating of an object by grinding between grinding surface 211 of upper mill 21 of mill 2 and grinding surface 221 of lower mill 22 may be by shear mainly resulting from intersection between edges of the grooves. There is an angle of intersection between grooves optimal for shear, and at an optimal angle of intersection between grooves, force applied to edges, that is, rotation torque, can be lowered. According to tests, an angle of intersection suitable for shear was approximately 30°. When an angle of intersection is obtuse, an object is fed toward the outer circumference through the groove without substantially being grated. According to the tests, an angle of intersection suitable for feeding was approximately 150°.

A feeding speed and a grain size of powders discharged after grating relate to each other. A higher feeding speed leads to a coarse grain size, and a lower feeding speed leads to a fine grain size. The number of feed grooves and an angle can be optimized in order to obtain a desired grain size. A desired grain size in the present embodiment is approximately 10 μm in grating of tea leaves. Though a single feed groove 202 is provided in the present embodiment, a plurality of feed grooves 202 may be provided in rotation symmetry with respect to center of rotation C, depending on a desired grain size and other parameters.

In mill 2 in the present embodiment, an angle of intersection between the grooves in the upper mill and the lower mill is always constant with rotation of upper mill 21 and lower mill 22 relative to each other, so that a condition more suitable for grating can be provided to an object to be grated and grating capability per unit area can be improved.

Furthermore, since an angle of intersection between the grooves in the upper mill and the lower mill is always constant and an angle of intersection mainly contributing to shear of an object to be grated and an angle of intersection mainly contributing to feeding of the object to be grated can be provided in relative rotation, grating capability and processing capability per unit area can be improved. Mill 2 including a shape of grooves along an equiangular spiral in the present embodiment exhibited processing capability at least twice as high as that of a mill having a shape of grooves in the background art.

Furthermore, a more suitable angle of intersection mainly contributing to shear of an object to be grated can be provided and rotation torque necessary during grating can be lowered. An optimal angle of shear is provided by α1 and a feeding speed for obtaining a desired grain size can be optimized by α2.

(Embodiment 2: Shape of Groove)

Figure 17:
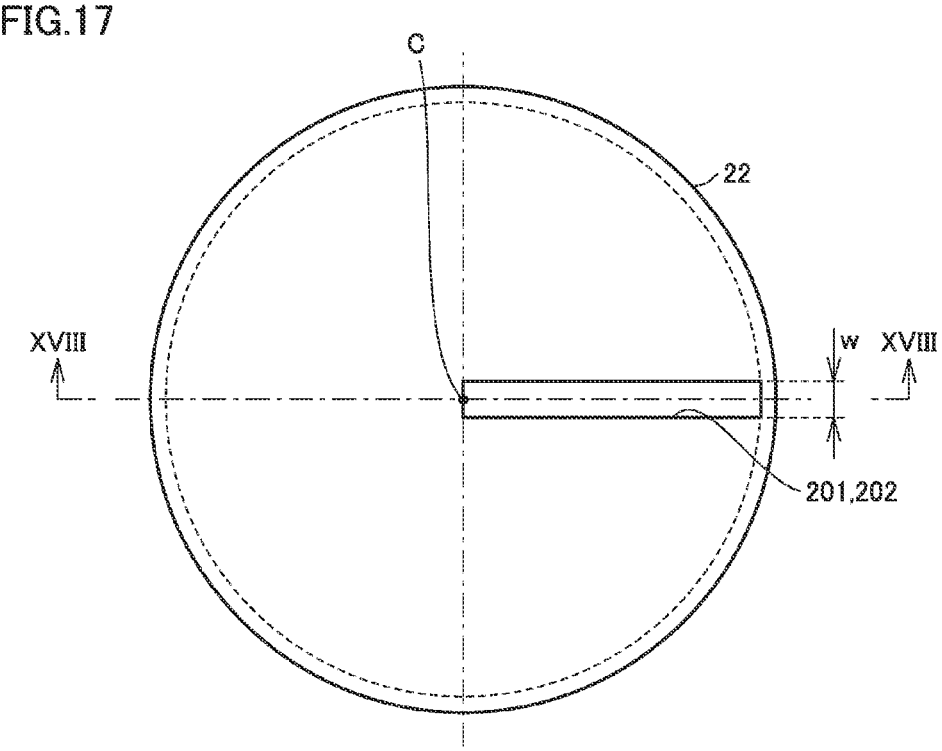
FIG. 17 is a plan view showing a shape of a groove provided in a lower mill in Embodiment 2.
Figure 18:
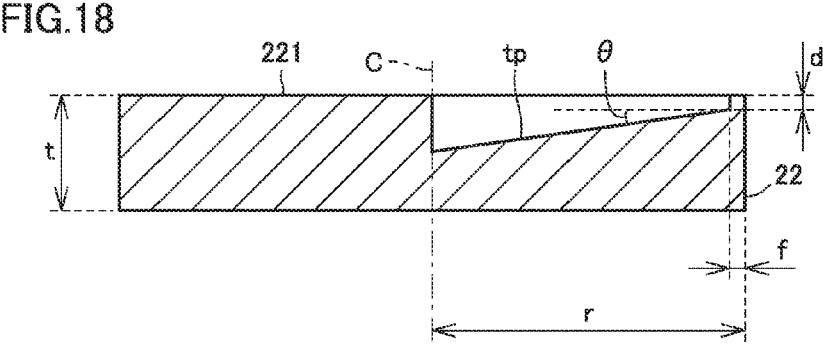
FIG. 18 is a cross-sectional view along the line XVIII-XVIII in FIG. 17.

An embodiment relating to a shape of grooves provided in lower mill 22 and upper mill 21 will now be described with reference to FIGS. 17 and 18. FIG. 17 is a plan view showing a shape of a groove provided in lower mill 22 in the present embodiment, and FIG. 18 is a cross-sectional view along the line XVIII-XVIII in FIG. 17. Since a groove the same as in lower mill 22 is formed also in upper mill 21, description in connection with upper mill 21 will not be provided.

A speed of passage of powders through a groove is higher as a width of the groove is smaller and a depth of the groove is smaller. A parameter for forming a groove which is particularly suitable for grating of tea leaves has not yet been disclosed. According to FIGS. 17 and 18, shear groove 201 and feed groove 202 formed in the grinding surface of lower mill 22 have a width w desirably from 0.5 mm≤w≤1.5 mm.

Width w of shear groove 201 and feed groove 202 means width w along a direction orthogonal to a direction of extension of shear groove 201 and feed groove 202. By setting width w of shear groove 201 and feed groove 202 to 0.5 mm≤w≤1.5 mm, ease in cleaning of powders in shear groove 201 and feed groove 202 can be ensured while a feeding speed in grating of tea leaves is ensured.

A depth of the groove of d mm is preferably ensured on an outermost circumferential side. Furthermore, a flat portion f where no groove is present is desirably provided around the entire circumference of an edge portion at an outermost circumference on a half line extending from center of rotation C of the grinding surface. Desirably, d is approximately 0.1 mm≤d≤1 mm and f is not smaller than 0.5 mm.

By thus pooling powders in the groove and restricting discharge thereof, powders having a desired grain size can be obtained also with a small area (a length of a path of a groove).

Depth d of the groove desirably has an inclined surface tp increasing in depth toward center of rotation C. Thus, a depth can be provided from the center of rotation toward the outer circumference in accordance with a grain size in grating, and a speed at which powder particles in one groove advance can substantially be constant. An angle of inclination θ of inclined surface tp with respect to the grinding surface is desirably approximately 2.3°≤θ≤4.5°.

In the present embodiment, lower mill 22 has radius r approximately from 15 mm to 30 mm and has thickness t of approximately 8 mm. By using mill 2 having lower mill 22 and upper mill 21, a result of a grain size around 10 μm was obtained in a test of grating of tea leaves.

A shape of grooves for an object to be grated, in particular for tea leaves, can suitably be provided, and a desired grain size can be obtained in a limited area, that is, a length of a path of the groove, by suppressing a speed of discharge of powders toward the outer circumference. Therefore, an area of a mill can be decreased and reduction in size of a product and lowering in necessary torque can be achieved.

Regarding a parameter for a shape of grooves included in the mill in the present embodiment, a shape of the grooves is not limited to the shape of the grooves along the equiangular spiral shown in Embodiment 1. Grooves extending substantially along a straight line in rotation symmetry with respect to center of rotation C from center of rotation C toward the outer circumference, for example, as shown in FIGS. 5 and 6 (background art), are applicable. In this case as well, powders having a desired grain size can be obtained, and a speed at which powder particles in a single groove advance can substantially be constant. Even grooves in a linear shape shown in the background art could obtain a result of a grain size around 10 μm in a test of grating of tea leaves.

Specifically, in a mill having an upper mill and a lower mill each provided with a grinding surface, the grinding surface includes linear grooves extending from a center of rotation toward an outer circumference, a flat portion where no groove is present is provided around the entire circumference of an outermost circumferential edge portion of the grinding surface, width w along a direction orthogonal to a direction of extension of the groove is within a range of 0.5 mm≤w≤1.5 mm, the groove has an inclined surface increasing in depth toward the center of rotation, a depth d from the grinding surface on the outermost circumferential side of the inclined surface is within a range of 0.1 mm≤d≤1 mm, and an angle of inclination θ of the inclined surface with respect to the grinding surface is 2.3°≤θ≤4.5°.

Thus, with a conventional shape of grooves, a shape of grooves for an object to be grated, in particular for tea leaves, can suitably be provided, and a desired grain size can be obtained within a limited area, that is, a length of a path of a groove, by suppressing a speed of discharge of powders toward the outer circumference. Therefore, an area of a mill can be decreased and reduction in size of a product and lowering in necessary torque can be achieved.

(Embodiment 3: Milling Machine 1000)

Figure 19:
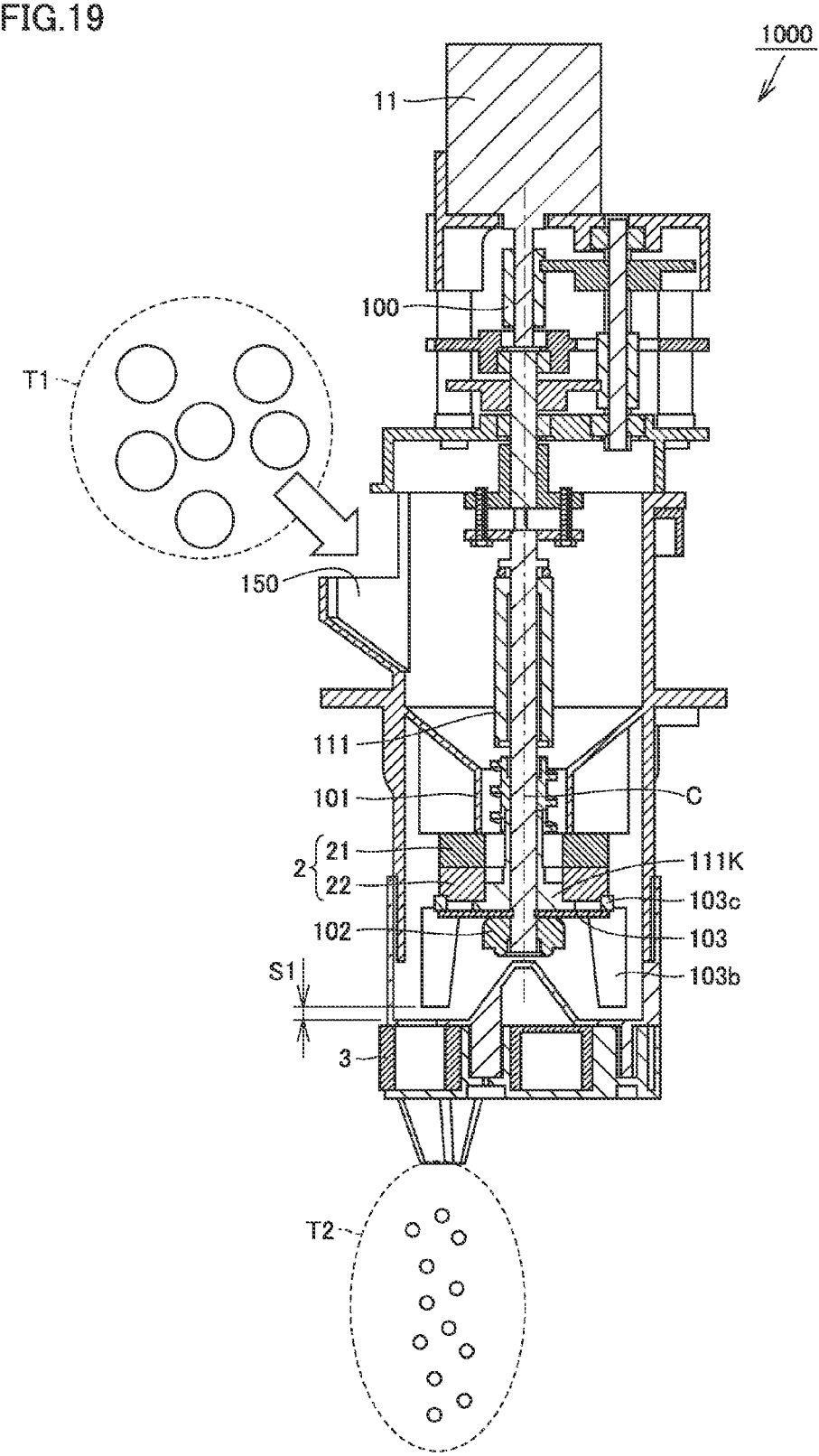
FIG. 19 is a vertical cross-sectional view showing a structure of a milling machine in Embodiment 3.
Figure 20:
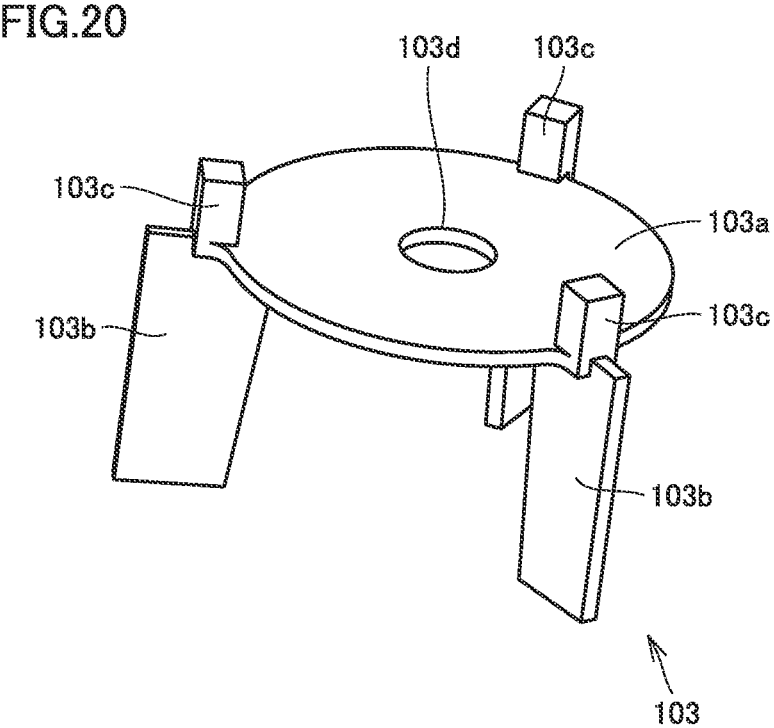
FIG. 20 is an overall perspective view showing a structure of a blade included in the milling machine in Embodiment 3.

A milling machine 1000 in the present embodiment will be described with reference to FIGS. 19 and 20. FIG. 19 is a vertical cross-sectional view showing a structure of milling machine 1000 in the present embodiment, and FIG. 20 is an overall perspective view showing a structure of a blade 103 included in milling machine 1000 in the present embodiment.

Referring to FIG. 19, upper mill 21 and lower mill 22 are fastened by a fixing screw 102 while they are pressed against a fixing rib 101. Upper mill 21 has a key groove in an outer circumferential surface and rotation thereof is stopped by fixing rib 101. Lower mill 22 is coupled to shaft 111 by hole 204 having a key groove. Rotational driving force of a motor 11 rotationally drives shaft 111 through a gear box 100. Rotational driving force of motor 11 is thus transmitted to lower mill 22.

For example, an object to be grated T1 such as tea leaves is introduced from a shown inlet port 150, taken into the grinding surface of mill 2 through an opening (central portion) in upper mill 21, grated, and then discharged downward from an outer circumferential surface of mill 2.

A dispensing portion 3 for temporarily storing powders is provided below milling machine 1000. Dispensing portion 3 is provided to be rotatable around center of rotation C along a horizontal direction. When a certain amount of powders is stored, dispensing portion 3 rotates around center of rotation C and drops powders T2 downward. Blade 103 sending powders into dispensing portion 3 is attached to rotating lower mill 22.

(Blade 103)

FIG. 20 shows an overall perspective view of blade 103. Blade 103 has a rotation plate 103a having a shaft core hole 103d. A leveling plate 103b is attached to an outer circumferential surface of rotation plate 103a at a pitch of 120°. A key block 103c is provided in leveling plate 103b. Key block 103c fits into a key groove (not shown) provided in lower mill 22 and blade 103 rotates together with lower mill 22.

Blade 103 is desirably made of a material high in thermal conductivity such as a metal. Blade 103 rotating together with lower mill 22 plays a role as a heat dissipation fin of mill 2 During grating, mill 2 generates heat resulting from friction heat between upper mill 21 and lower mill 22 and friction heat from an object to be grated. Thermal influence onto an object to be grated, however, can be suppressed by dissipating this generated heat by blade 103 so as to suppress increase in temperature of mill 2. For example, a flavor is not destroyed during grating of tea leaves.

Dispensing portion 3 is designed to have a desired volume, and a desired amount of powders T2 can be introduced from an opening below by rotating by sliding dispensing portion 3 around center of rotation C along the horizontal direction after blade 103 levels off powders in dispensing portion 3.

Thus, with a simplified construction, a sufficient time period for grating is ensured and dispensing of powders can be achieved.

(Embodiment 4: Beverage Preparation Apparatus 2000)

Figure 21:
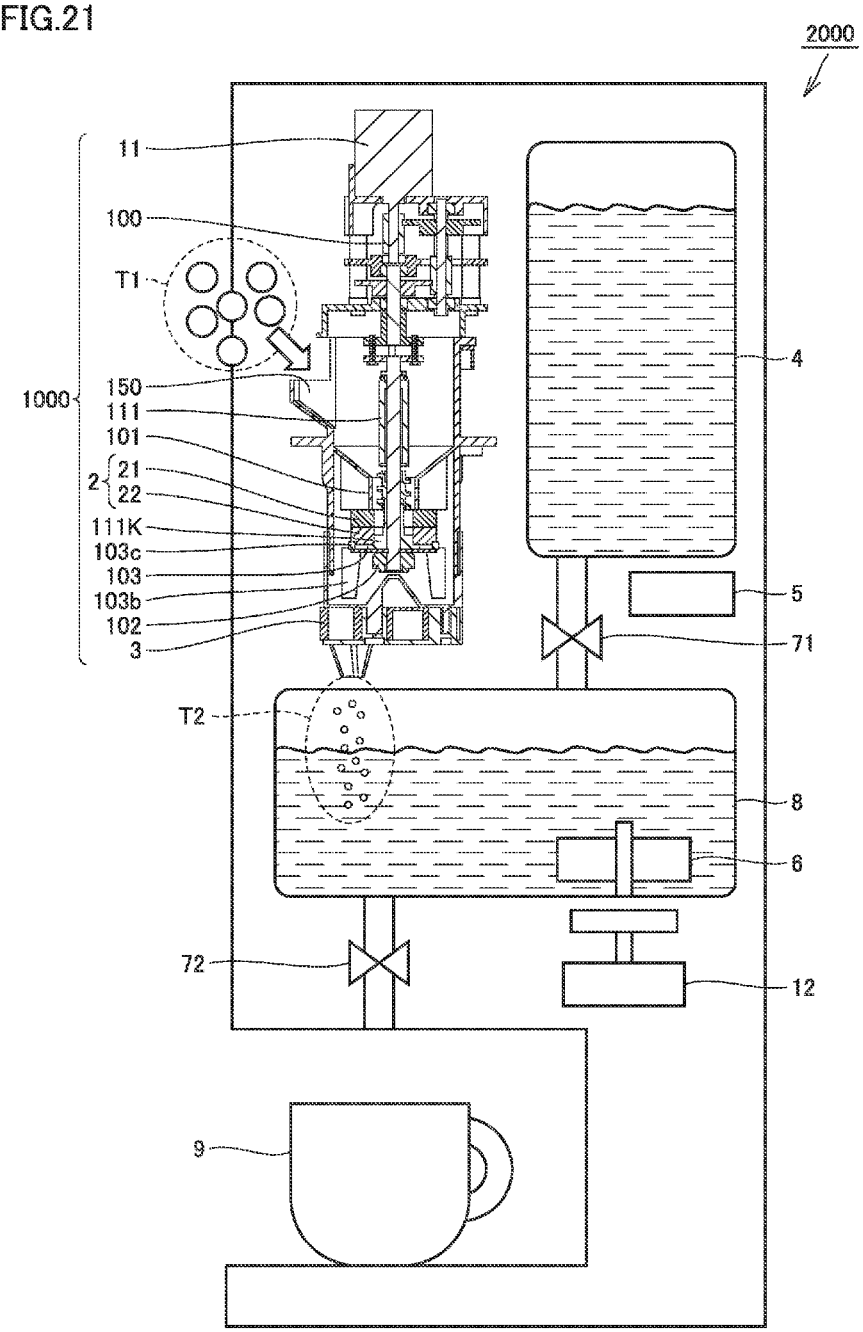
FIG. 21 is a vertical cross-sectional view showing a structure of a beverage preparation apparatus in Embodiment 4.

A structure of a beverage preparation apparatus 2000 including milling machine 1000 in the embodiment above will be described with reference to FIGS. 21 to 23. FIG. 21 is a vertical cross-sectional view showing a structure of beverage preparation apparatus 2000 in the present embodiment, FIG. 22 is a block diagram showing an operation flow in beverage preparation apparatus 2000 in the present embodiment, and FIG. 23 is a diagram showing relation between processing capability of the mill and the number of rotations in the present embodiment.

Beverage preparation apparatus 2000 in the present embodiment has milling machine 1000 described above, a tank 4, and an agitation tank 8. Tank 4 contains a liquid such as drinking water and is heated by a heater 5 as necessary, and agitation tank 8 is supplied with water or hot water by opening and closing of an electromagnetic valve 71.

An agitation blade 6 is placed in agitation tank 8. Agitation blade 6 is rotationally driven in a non-contact manner with magnetic force by an agitation motor 12. Therefore, agitation tank 8 as a whole can be removed and washed. Powders T2 are introduced into agitation tank 8 from dispensing portion 3 of milling machine 1000 and agitated as agitation blade 6 rotates. After agitation, a drink (for example, matcha) is poured into a cup 9 as an electromagnetic valve 72 is opened and closed.

Figure 22:
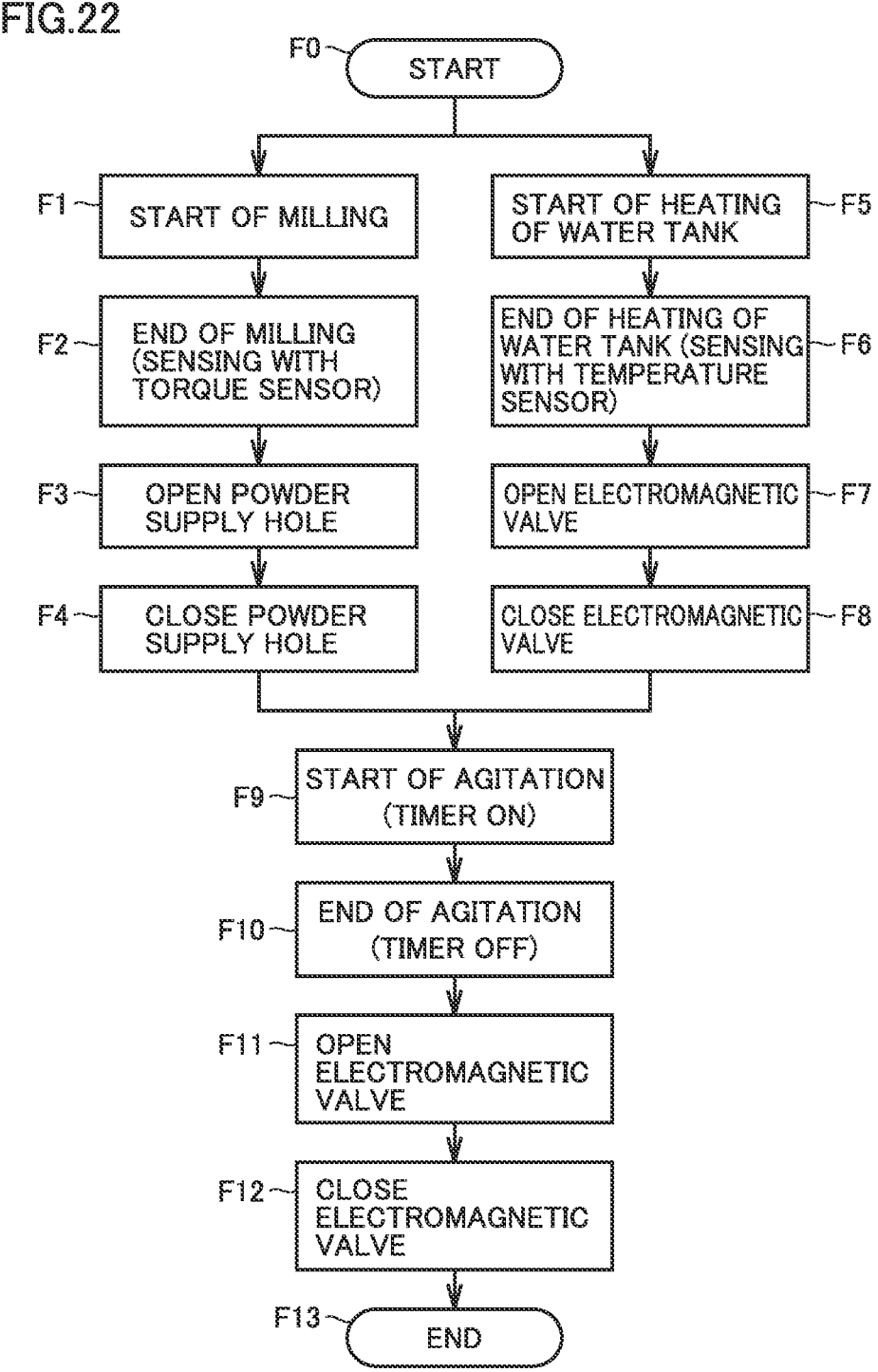
FIG. 22 is a block diagram showing an operation flow in the beverage preparation apparatus in Embodiment 4.
Figure 23:
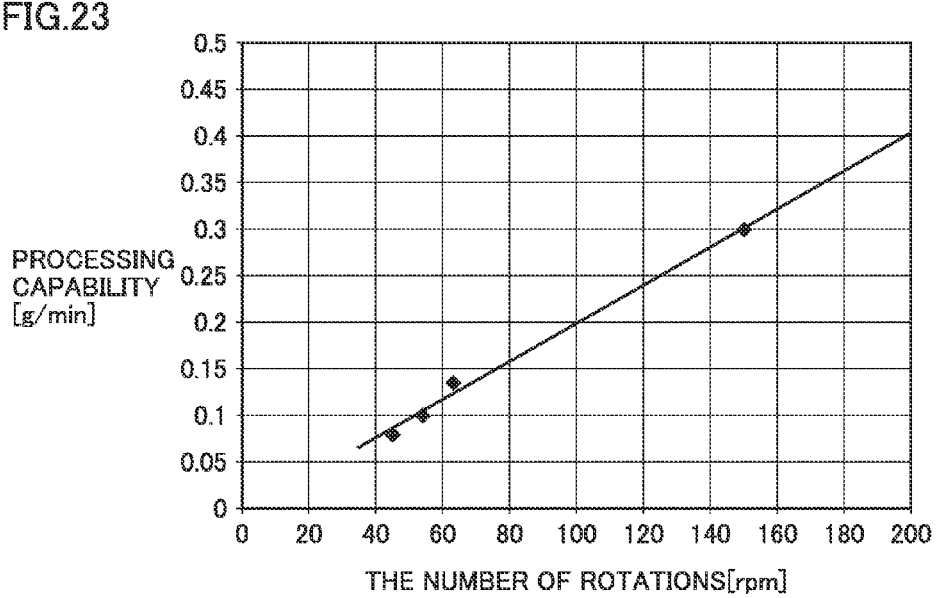
FIG. 23 is a diagram showing relation between the number of rotations and processing capability of a mill in Embodiment 4.

FIG. 22 shows a more detailed operation flow in beverage preparation apparatus 2000. As a start signal is input to beverage preparation apparatus 2000 (F0), start of milling (F1) by milling machine 1000 and start of heating of a water tank (F5) are performed in parallel. As end of milling (F2) by milling machine 1000 is sensed by a torque sensor, a hole for supply of powders is opened (F3) so that powders T2 are introduced into agitation tank 8 from dispensing portion 3. Thereafter, the hole for supply of powders is closed (F4).

As end of heating of the water tank (F6) is sensed by a temperature sensor, electromagnetic valve 71 is opened (F7)

so that hot water is supplied into agitation tank 8. Thereafter, electromagnetic valve 71 is closed (F8).

As powders T2 and hot water are introduced into agitation tank 8, agitation by rotation by agitation blade 6 is started in agitation tank 8 (F9). After agitation for a certain period of time is counted by a timer, agitation by rotation by agitation blade 6 ends (F10). After agitation by agitation blade 6, electromagnetic valve 72 is opened (F11) so that a drink is poured into cup 9. Thereafter, electromagnetic valve 72 is closed (F12) and the operation flow in beverage preparation apparatus 2000 ends (F13).

(The Number of Rotations of Mill 2)

Relation between the number of rotations of mill 2 and processing capability will be described with reference to FIG. 23. Blade 103 desirably has a function as a heat dissipation fin. Heat generation by a mill due to friction during grating can readily be suppressed and thermal influence onto an object to be grated can readily be suppressed. Furthermore, the number of rotations of mill 2 can be increased while thermal influence is avoided. The graph in FIG. 23 shows processing capability of the mill with respect to the number of rotations of mill 2. It can be seen in FIG. 23 that processing capability improves in proportion to the number of rotations.

Efficiency per necessary torque is higher by increasing a rotation speed than by enhancing processing capability by increasing an area of the grinding surface of mill 2 For example, in a test in which tea leaves are used, it could be confirmed that there is no thermal influence up to the number of rotations of 150 rpm of mill 2 by placing blade 103 in mill 2 Though processing at approximately 60 rpm has been a mainstream in a conventional mill, torque is lower in the present embodiment than in a conventional example and processing capability can be exhibited in a high-rotation region.

Thus, according to beverage preparation apparatus 2000 in the present embodiment, capability of grating per unit area of a mill can be improved and rotation torque necessary for grating can be lowered. Therefore, lower cost of a rotational drive system and reduction in size of a product can be achieved. Therefore, a beverage preparation apparatus smaller in size and more inexpensive than in a conventional example can be provided.

(Embodiment 5: Structure of Milling Machine)

Figure 24:
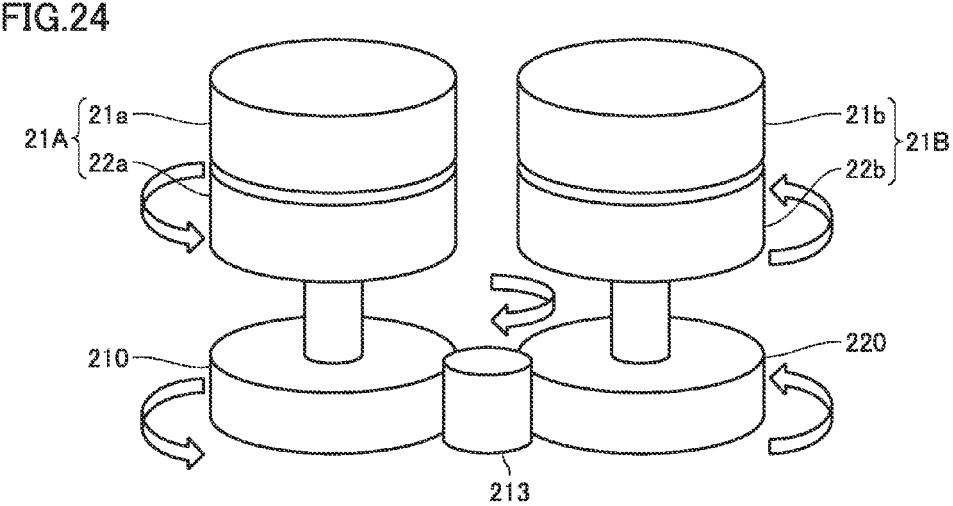
FIG. 24 is an overall perspective view showing a structure of a milling machine in Embodiment 5.

A structure of a milling machine in the present embodiment will now be described with reference to FIG. 24. FIG. 24 is an overall perspective view showing a structure of a milling machine in the present embodiment. Referring to FIG. 24, rotation of a motor gear 213 is transmitted to a first gear 210 and a second gear 220.

A first lower mill 22*a* of a first-stage mill 21A is coupled to first gear 210, a second lower mill 22*b* of a second-stage mill 21B is coupled to second gear 220, and first lower mill 22*a* and second lower mill 22*b* rotate as first gear 210 and second gear 220 rotate.

A first upper mill 21*a* of first-stage mill 21A and a second upper mill 21*b* of second-stage mill 21B are fixed not to rotate, and pressing force is applied to first upper mill 21*a* and first lower mill 22*a* as well as to second upper mill 21*b* and second lower mill 22*b* by not-shown pressing means.

According to the structure of the milling machine in the present embodiment, a plurality of mills (21A and 21B) can function as a result of rotational drive (a rotational drive apparatus) of one motor gear 213 commonly provided for a plurality of mills so that processing capability can be multiplied.

An amount of powders obtained per unit time (processing capability) is mainly in proportion to the number of grooves. On the other hand, under an optimized condition, the number of grooves which can be formed is in proportion to a diameter of the mill and necessary rotation torque is in proportion to a square of a diameter of the mill. Therefore, as a result of optimization, a result of lower necessary torque is obtained by setting the number of mills to two instead of doubling processing capability by increasing an area of a mill.

(Embodiment 6: Structure of Milling Machine)

Figure 25:
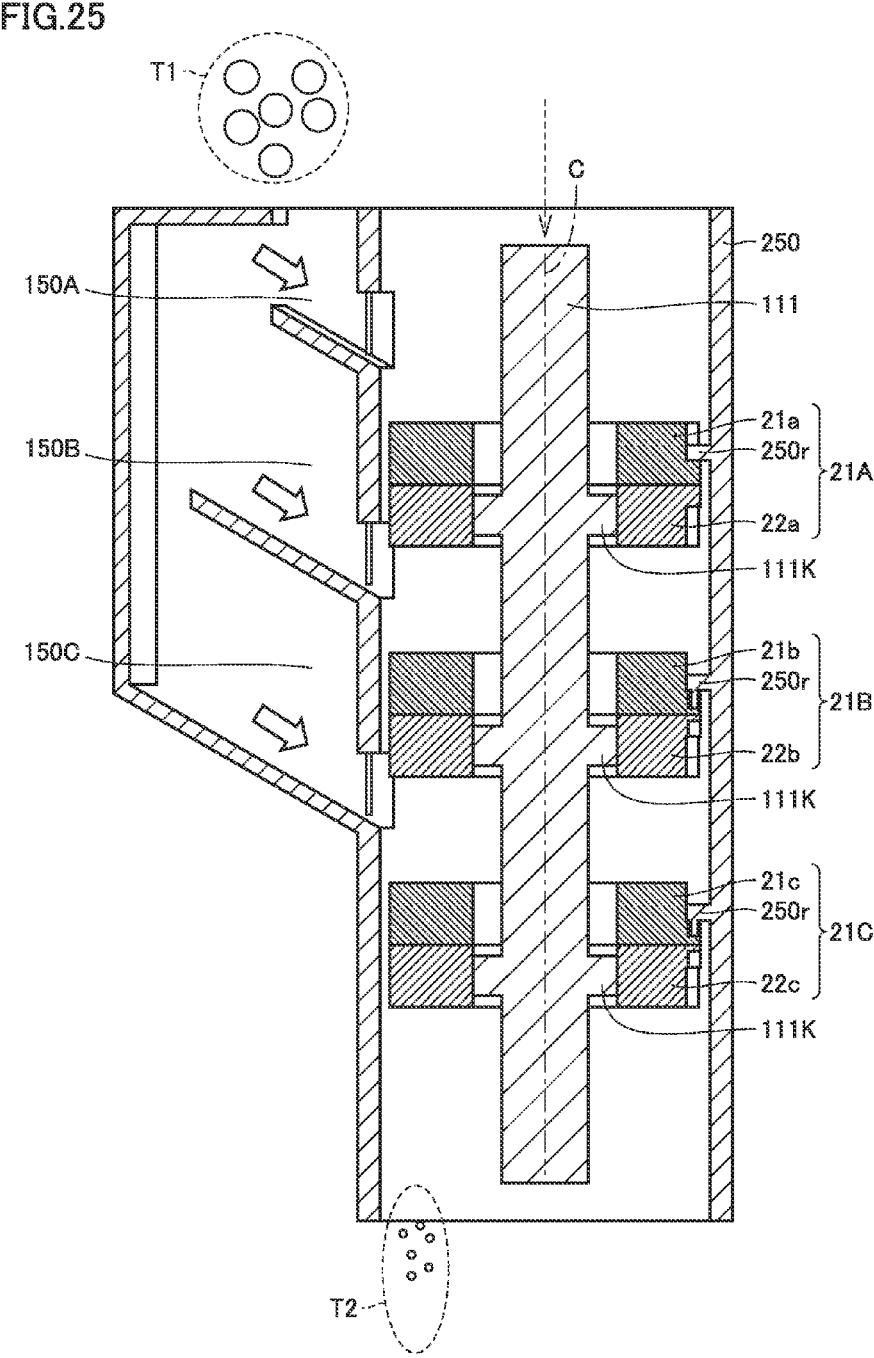
FIG. 25 is an overall perspective view showing a structure of a milling machine in Embodiment 6.

A structure of a milling machine in the present embodiment will now be described with reference to FIG. 25. FIG. 25 is an overall perspective view showing a structure of a milling machine in the present embodiment. Referring to FIG. 25, shaft 111 is provided with first-stage mill 21A, second-stage mill 21B, and a third-stage mill 21C.

First-stage mill 21A has first upper mill 21*a* and first lower mill 22*a*, and first upper mill 21*a* and first lower mill 22*a* are pressed against each other. Rotation of first upper mill 21*a* is bound by a rotation stop rib 250*r* provided in a housing 250, and rotation of shaft 111 is transmitted to first lower mill 22*a* by a key 111K provided in shaft 111.

Second-stage mill 21B has second upper mill 21*b* and second lower mill 22*b*, and second upper mill 21*b* and second lower mill 22*b* are pressed against each other. Rotation of second upper mill 21*b* is bound by rotation stop rib 250*r* provided in housing 250, and rotation of shaft 111 is transmitted to second lower mill 22*b* by key 111K provided in shaft 111.

Third-stage mill 21C has a third upper mill 21*c* and a third lower mill 22*c* and third upper mill 21*c* and third lower mill 22*c* are pressed against each other. Rotation of third upper mill 21*c* is bound by rotation stop rib 250*r* provided in housing 250, and rotation of shaft 111 is transmitted to third lower mill 22*c* by key 111K provided in shaft 111.

Rotation stop rib 250*r* may be a pin separately inserted after insertion of first-stage mill 21A, second-stage mill 21B, and third-stage mill 21C in shaft 111. Housing 250 does not have to integrally be molded but may be in a form as being divided along a not-shown cross-section (two-part housing).

As rotation of the motor and the gear is transmitted to shaft 111, first lower mill 22*a*, second lower mill 22*b*, and third lower mill 22*c* are simultaneously rotationally driven. Object to be grated T1 is introduced into illustrated inlet ports 150A, 150B, and 150C as being branched into respective mills. Powders T2 grated by each mill are discharged downward from a side surface of each mill.

According to the present embodiment, a plurality of mills are provided and rotated coaxially. Thus, the number of mills can be increased to thereby enhance processing capability. Furthermore, since a gear and a rotation shaft are used in common, reduction in number of parts and lower cost can be achieved. Furthermore, a footprint can be kept low.

(Embodiment 7: Structure of Milling Machine)

Figure 26:
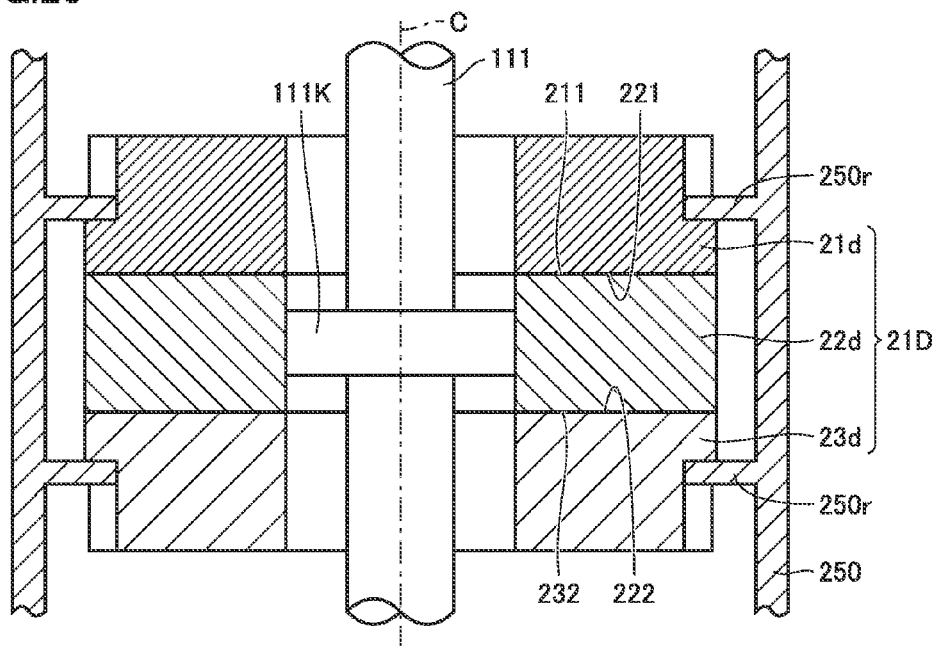
FIG. 26 is an overall perspective view showing a structure of a milling machine in Embodiment 7.

A structure of a milling machine in the present embodiment will now be described with reference to FIG. 26. FIG. 26 is an overall perspective view showing a structure of a milling machine in the present embodiment. Referring to FIG. 26, a mill 21D is provided in shaft 111.

Mill 21D has an upper mill 21*d*, an intermediate mill 22*d*, and a lower mill 23*d*, and upper mill 21*d*, intermediate mill 22*d*, and lower mill 23*d* are pressed against one another. Rotation of upper mill 21*d* and lower mill 23*d* are bound by rotation stop rib 250*r* provided in housing 250, and rotation of shaft 111 is transmitted to intermediate mill 22*d* by key 111K provided in shaft 111.

An object to be grated is grated between grinding surface 211 of upper mill 21d and grinding surface 221 of intermediate mill 22d and the object to be grated is grated between a grinding surface 222 of intermediate mill 22d and a grinding surface 232 of lower mill 23d.

According to the present embodiment, two grinding surfaces can be formed by superimposing upper mill 21d, intermediate mill 22d, and lower mill 23d coaxially on one another. Further reduction in number of parts and a compact size of an apparatus can thus be achieved.

(Embodiment 8: Mill 2A)

Figure 27:
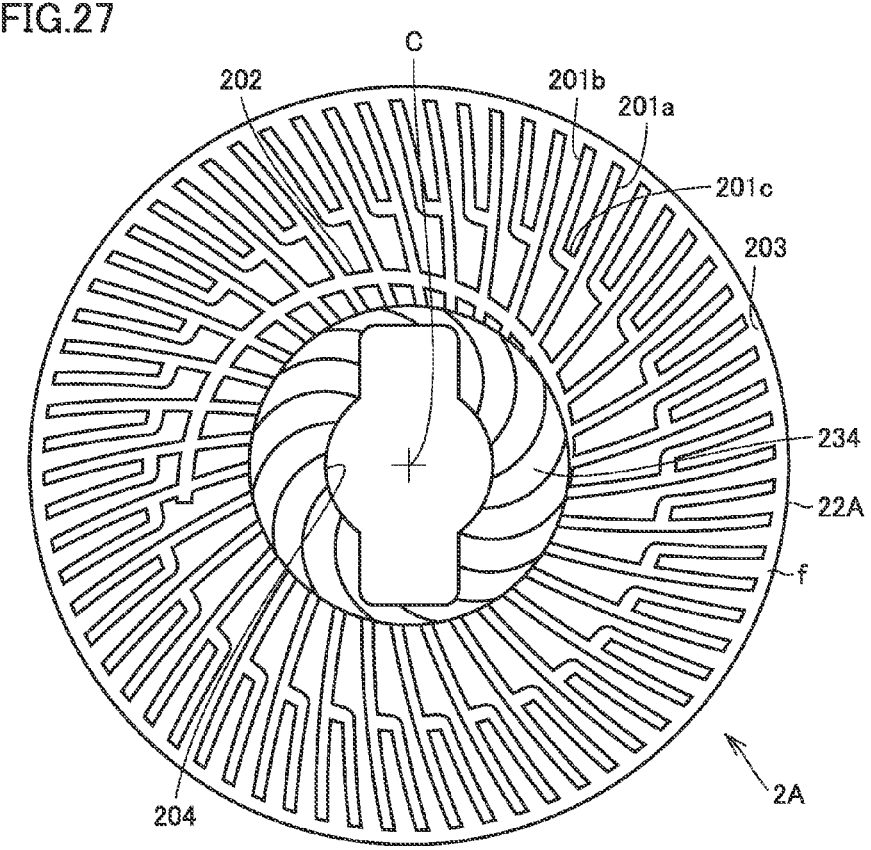
FIG. 27 is a diagram showing a shape of grooves provided in a grinding surface of a lower mill in Embodiment 8, which corresponds to the diagram along the line II-II in FIG. 1.

A mill 2A in Embodiment 8 will be described with reference to FIGS. 27 and 28. FIG. 27 is a diagram showing a shape of grooves provided in a grinding surface of a lower mill 22A in the present embodiment, which corresponds to the diagram viewed along the line II-II in FIG. 1, and FIG. 28 is a perspective view of lower mill 22A in the present embodiment.

Mill 2A in the present embodiment is the same in basic construction as mill 2 having upper mill 21 and lower mill 22 described in Embodiment 1, and different in shape of a groove provided in the grinding surface of upper mill 21 and lower mill 22. The shape of the groove provided in the grinding surface of the upper mill of mill 2A is the same as the shape of the groove provided in the grinding surface of lower mill 22A. Therefore, the shape of the groove provided in the grinding surface of lower mill 22A will be described below.

Figure 28:
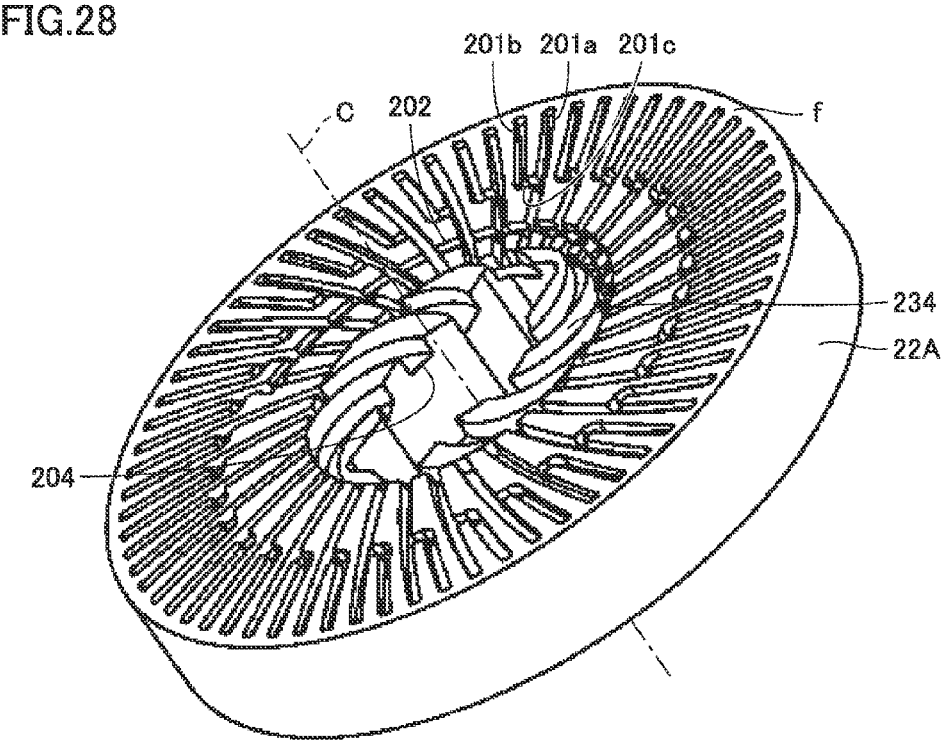
FIG. 28 is a perspective view of the lower mill in Embodiment 8.

Referring to FIGS. 27 and 28, as in lower mill 22 in Embodiment 1, a shear groove 201a and feed groove 202 are provided in the grinding surface of lower mill 22A of mill 2A in the present embodiment. A branch groove 201b is provided between shear groove 201 a and shear groove 201 a. A plurality of branch grooves 201b are provided in rotation symmetry with respect to center of rotation C similarly to shear groove 201a.

A bridging groove 201c is coupled to an end portion on an inner diameter side of branch groove 201b, so that shear groove 201a and branch groove 201b communicate with each other through bridging groove 201c. As in lower mill 22 in Embodiment 1, planar portion 203 is provided in the grinding surface at an outer circumferential end portion of shear groove 201a and branch groove 201b.

Similarly to shear groove 201a, branch groove 201b is also provided along equiangular spiral S1. Bridging groove 201c is a groove formed along a circumference around center of rotation C.

A supply groove 234 is provided in a region corresponding to tapered region tp1 of lower mill 22 in Embodiment 1. This supply groove 234 plays a role to lead a relatively large object to be grated effectively into mill 2A as mill 2A rotates. A plurality of supply grooves 234 are provided in rotation symmetry with respect to center of rotation C. Similarly to shear groove 201a, this supply groove 234 is desirably provided along an equiangular spiral.

(Modification)

Figure 29:
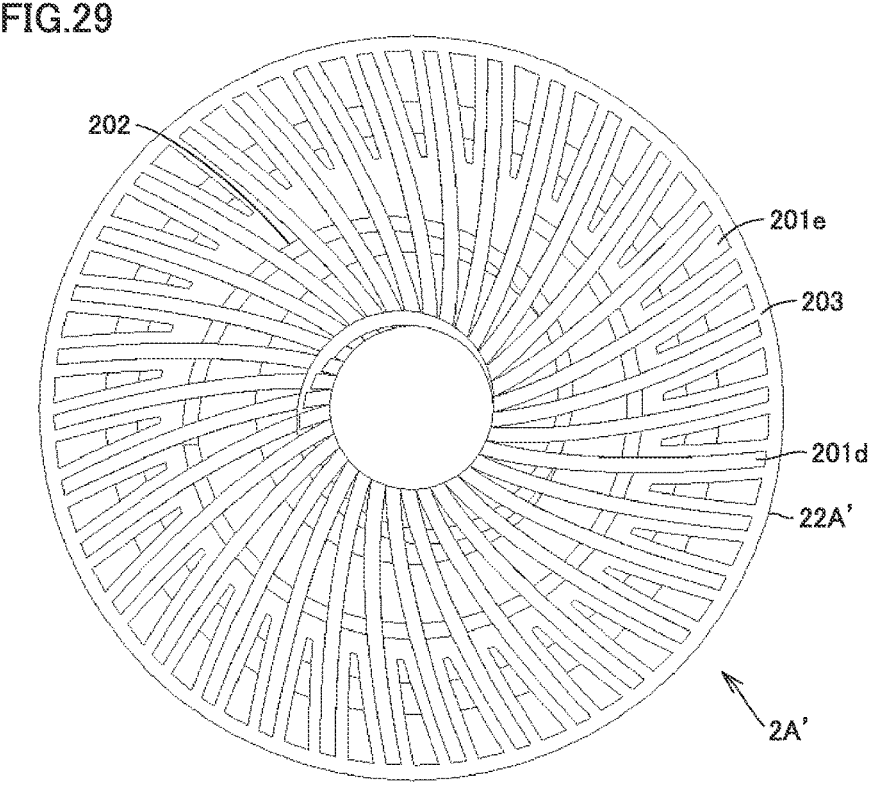
FIG. 29 is a diagram showing a shape of grooves provided in a grinding surface of a lower mill in a modification of Embodiment 8.
Figure 30:
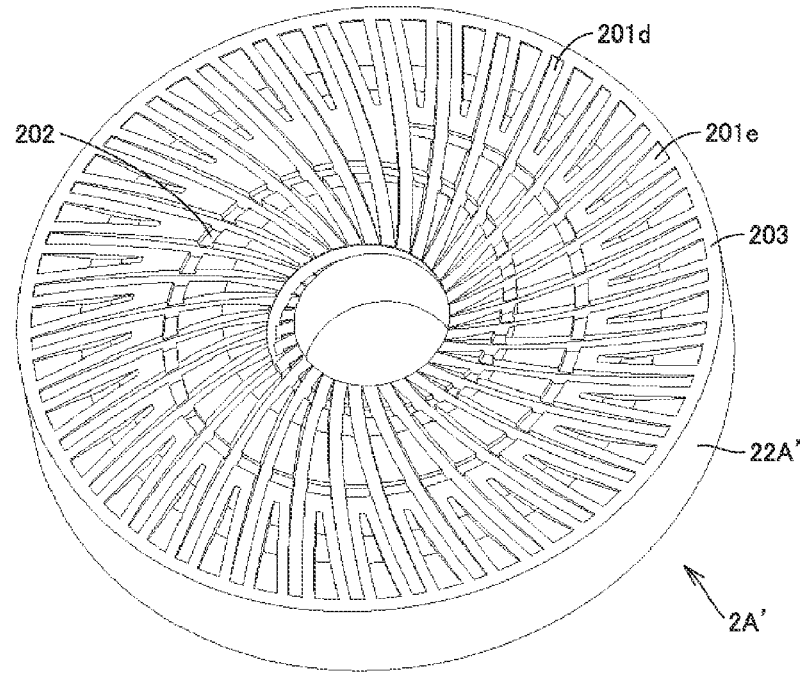
FIG. 30 is a perspective view of the lower mill in the modification of Embodiment 8.
Figure 31:
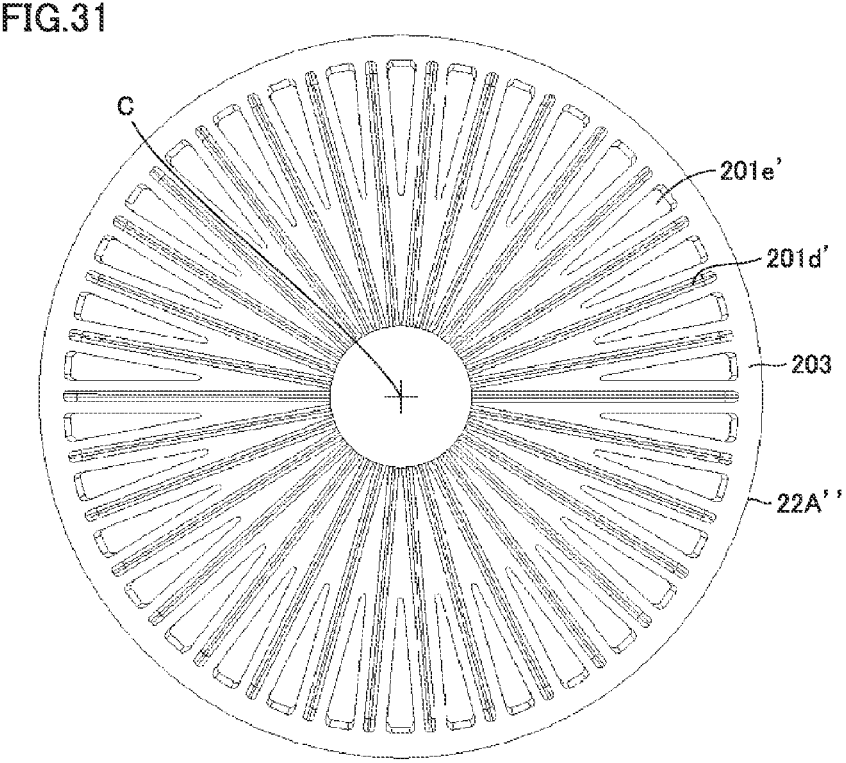
FIG. 31 is plan view of a lower mill in a further modification of Embodiment 8.

A mill 2N will be described as a modification of mill 2A in the present embodiment with reference to FIGS. 29 to 31. FIG. 29 is a diagram showing a shape of grooves provided in a grinding surface of a lower mill 22A' in the present embodiment, which corresponds to the diagram along the line II-II in FIG. 1. FIG. 30 is a perspective view of lower mill 22N in the present embodiment. FIG. 31 is plan view of a lower mill 22A" in a further modification of mill 2A in the present embodiment.

Mill 2A' in the modification of the present embodiment is the same in basic construction as mill 2A having upper mill 21 and lower mill 22 described above, and different in shape of a groove provided in the grinding surface of upper mill 21 and lower mill 22. A shape of a groove provided in the grinding surface of the upper mill of mill 2A' is the same as a shape of a groove provided in the grinding surface of lower mill 22A'. Therefore, the shape of the groove provided in the grinding surface of lower mill 22A' will be described below.

Referring to FIGS. 29 and 30, similarly to lower mill 22 in Embodiment 1, a shear groove 201d and feed groove 202 are provided along an equiangular spiral in the grinding surface of lower mill 22A' of mill 2A' in the present embodiment. Furthermore, a recess portion 201e is provided between shear groove 201d and shear groove 201d which are adjacent to each other.

Recess portion 201e has a function to grind a source material similarly to a shear groove, and a shape thereof is not limited to a substantially triangular shape as shown in FIG. 29 but any shape such as a rectangle, a trapezoid, or an oval is applicable so long as a recess portion is formed. Similarly to shear groove 201d, recess portion 201e may be provided along an equiangular spiral.

Similarly to lower mill 22 in Embodiment 1, planar portion 203 is provided in the grinding surface at an outer circumferential end portion of shear groove 201d and recess portion 201e.

Recess portion 201e is one of means for most densely arranging shear grooves in accordance with a diameter of the mill, and can be adopted not only in a lower mill but also in an upper mill. Though the number of grooves which can be arranged is limited because of concentration of grooves in the central portion, when a large diameter is ensured, shear grooves can most densely be arranged by providing a plurality of recess portions serving as shear grooves at points in the shear grooves intermediate toward an outer circumference.

An interval between the shear grooves increases toward the outer circumference, and thus there are more planar portions. By providing a recess portion in this planar portion, an effective range where shear can be provided can be increased.

In the lower mill in the present embodiment, shear grooves could efficiently be arranged and high grating capability could be realized. Though a shape of a shear groove along an equiangular spiral has been described by way of example as a form of provision of a recess portion between a shear groove and a shear groove, a shape of the shear groove is not limited as such. For example, arrangement of shear grooves 201d' along straight lines extending radially from center C of lower mill 22A" as shown in FIG. 31 or a shape of grooves as shown in FIGS. 5 and 6 can be expected to achieve the same effect by providing recess portions with the method described above.

(Embodiment 9: Shape of Mill in Other Forms)

In each embodiment above, though a shape of grooves provided in grinding surface 211 of upper mill 21 and a shape of grooves provided in grinding surface 221 of lower mill 22 are the same, in a mill 2B in the present embodiment, a shape of grooves provided in a grinding surface (first grinding surface) 360a of an upper mill (first mill) 360 and a shape of grooves provided in a grinding surface (second grinding surface) 350a of a lower mill (second mill) 350 are different from each other.

Figure 32:
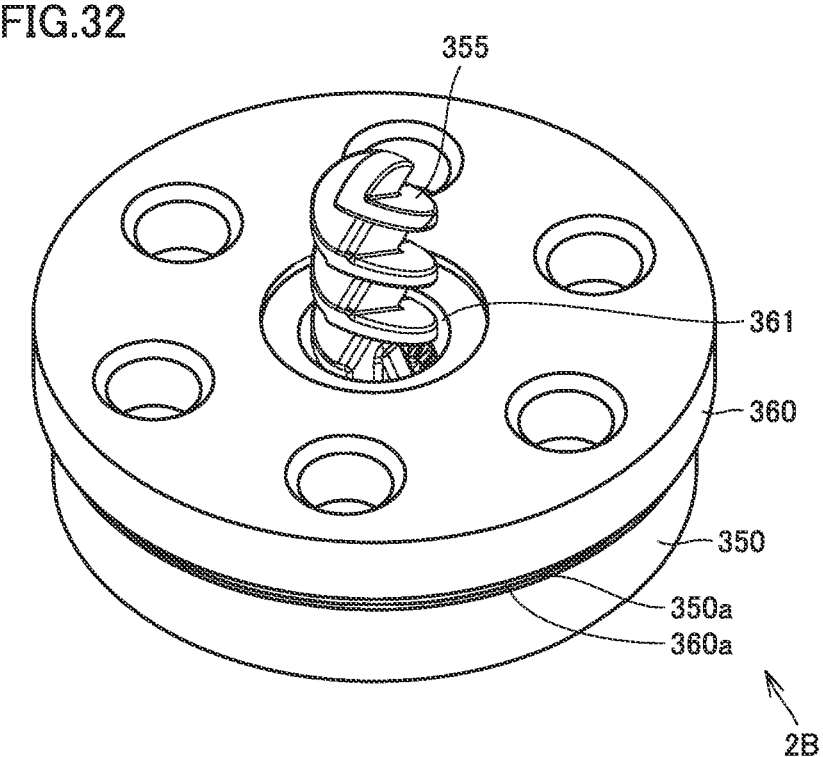
FIG. 32 is a perspective view showing an assembled view of a core, a lower mill, and an upper mill in Embodiment 9.

A detailed structure of a grating mechanism including lower mill 350, a core 355, and upper mill 360 in mill 2B in the present embodiment will be described with reference to FIGS. 32 to 34. FIG. 32 is a perspective view showing an assembled view of core 355, lower mill 350, and upper mill 360 in the present embodiment, FIG. 33 is an exploded perspective view from an upper side of core 355, lower mill 350, and upper mill 360 in the present embodiment, and FIG. 34 is an exploded perspective view from a lower side of core 355, lower mill 350, and upper mill 360 in the present embodiment.

Referring to FIG. 32, lower mill 350 and upper mill 360 are in contact with each other at grinding surface 350a of lower mill 350 and grinding surface 360a of upper mill 360. Core 355 is placed in lower mill 350 and protrudes upward from upper mill 360 through an opening (inlet port) 361 in upper mill 360.

Core 355 provided in upper mill 360 is provided with a spiral blade on an outer surface, and has a function to lead tea leaves representing an object to be grated into the mill with rotation of core 355. Opening 361 is a through hole greater in diameter (approximately from 12 mm to 15 mm) than core 355. As a result of action of core 355 and opening 361, tea leaves are satisfactorily guided to the grinding surface of mill 2B.

Figure 33:
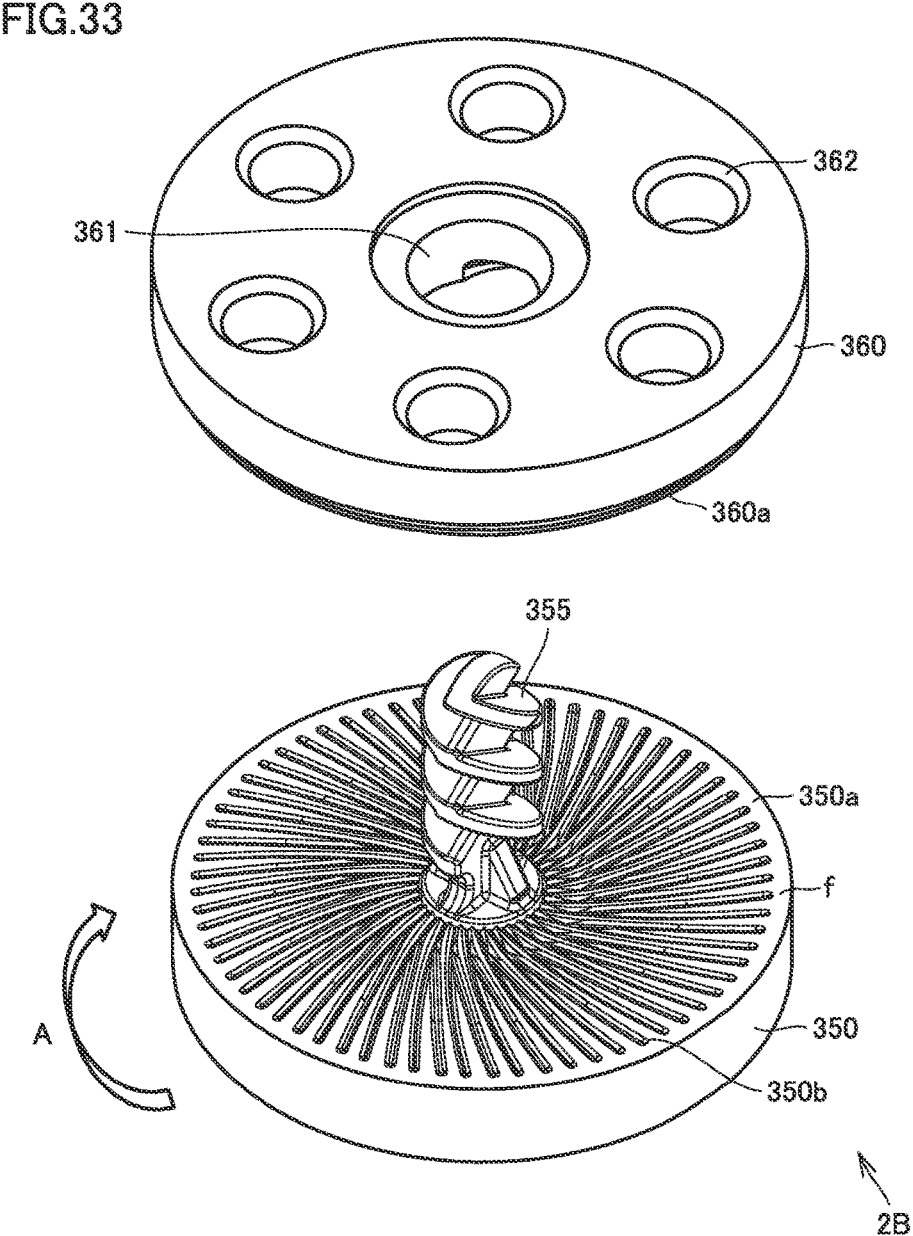
FIG. 33 is an exploded perspective view from an upper side of the core, the lower mill, and the upper mill in Embodiment 9.

Referring to FIG. 33, core 355 is fixed to the center of lower mill 350. A plurality of grating grooves (second groove) 350a for grating which extend from a side of the center of rotation toward an outer circumference are formed in grinding surface 350a of lower mill 350. Lower mill 350 and core 355 rotate in a direction shown with an arrow A with respect to upper mill 360. Upper mill 360 has a hole with bottom 362 in which a rotation stop pin (not shown) is inserted, and held by an upper mill holding member 370 (see FIGS. 53 and 54) so as not to rotate.

Referring to FIG. 34, core 355 passes through a center hole 350c in lower mill 350 and is fixed to lower mill 350 with a nail feature. A plurality of holes with bottom 350d in which rotational drive pins 345p (see FIGS. 53 and 54) provided in a milling shaft 345 (see FIGS. 53 and 54) are introduced, respectively, are provided in a rear surface of lower mill 350.

An intake groove 360c for sending an object to be grated which has passed through opening 361 into grinding surfaces 350a and 360a is formed in grinding surface 360a of upper mill 360 in addition to the plurality of grating grooves 360b for grating which extend from the side of the center of rotation toward the outer circumference. Intake groove 360c is a groove extending spirally outward from the center. Lower mill 350 and upper mill 360 are made of alumina and grinding surfaces 350a and 360a have a diameter, for example, around 50 mm.

Figure 35:
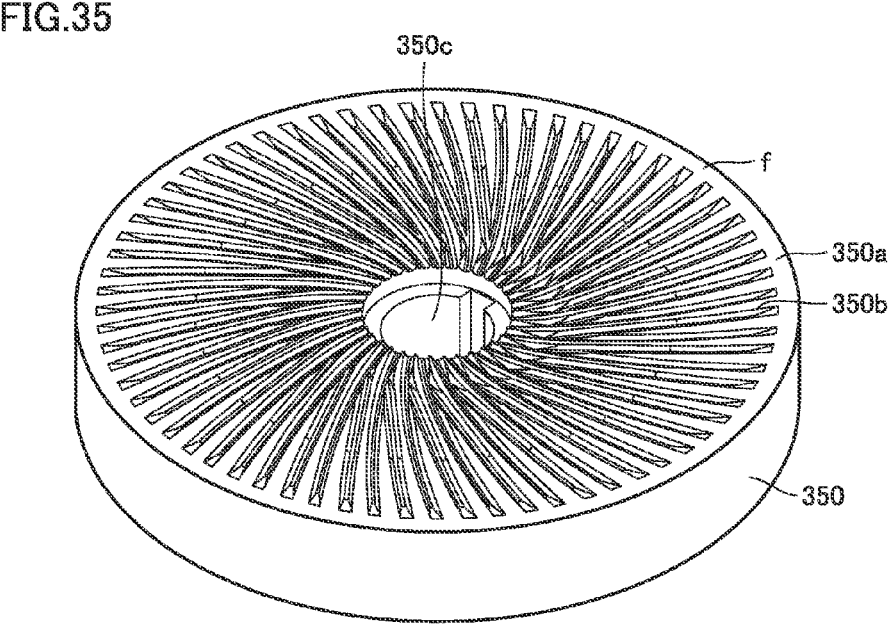
FIG. 35 is a perspective view of the lower mill in Embodiment 9.

Grating groove 350b provided in lower mill 350 will be described with reference to FIGS. 35 to 37. FIG. 35 is a perspective view of lower mill 350, FIG. 36 is a diagram showing a shape of a shear groove of lower mill 350, and FIG. 37 is a diagram showing a shape of the shear groove in another form.

Figure 36:
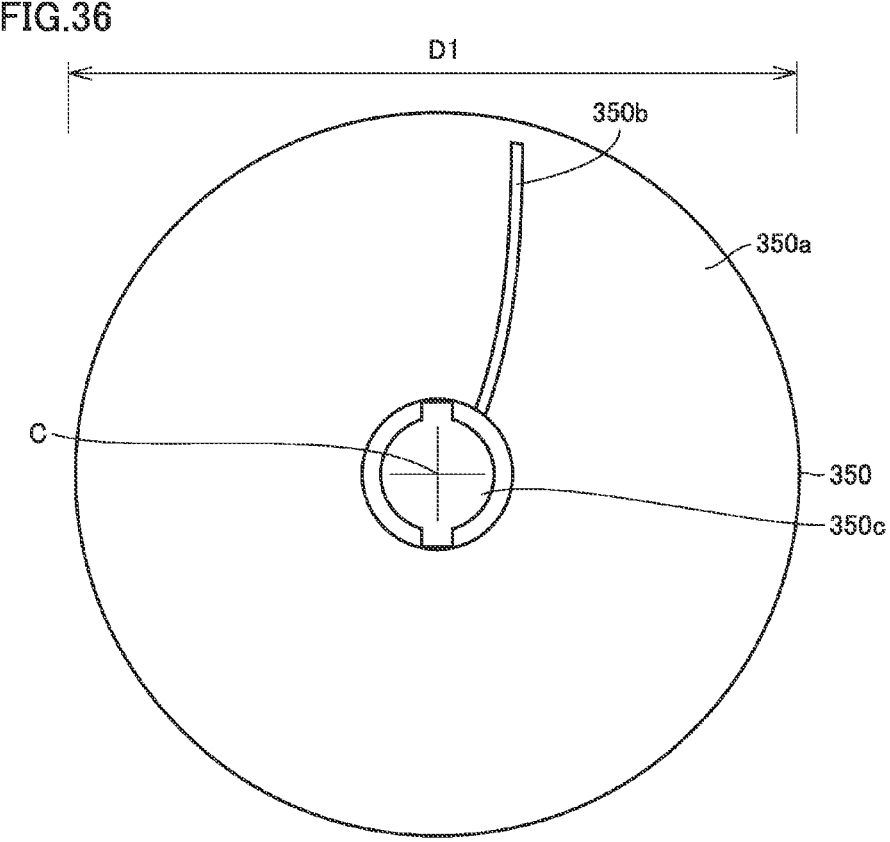
FIG. 36 is a diagram showing a shape of a shear groove in the lower mill in Embodiment 9.
Figure 37:
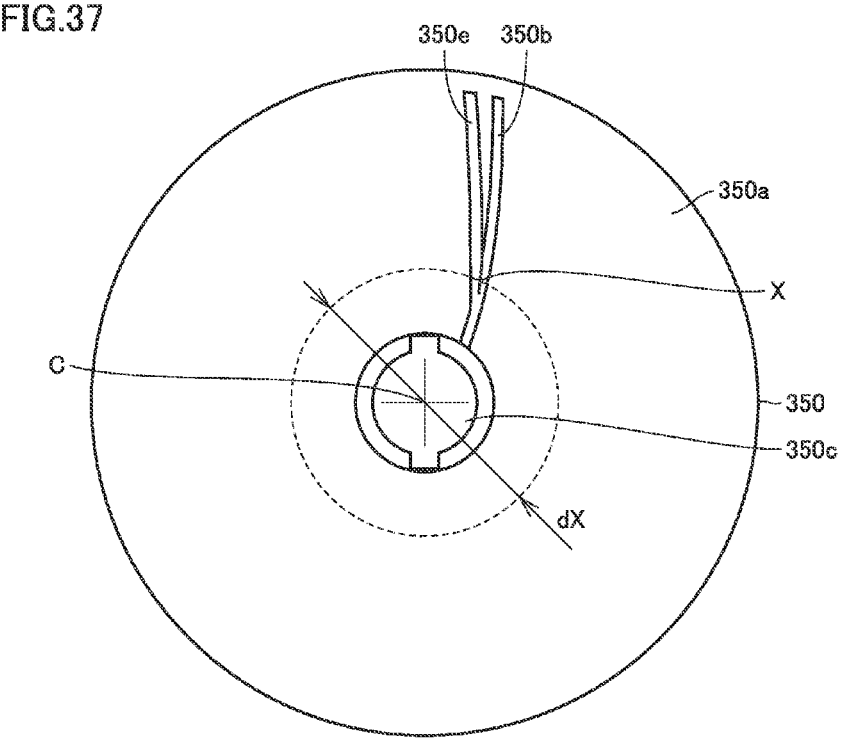
FIG. 37 is a diagram showing a shape of a shear groove in another form in Embodiment 9.

As shown in FIGS. 35 and 36, grating groove 350b of lower mill 350 implements a shear groove (hereinafter referred to as a shear groove (second groove) 350b).

Grating groove 360b (a shear groove 360b1 and a feed groove 360b2) of upper mill 360 which will be described later and intake groove 360c can set grating capability of a shear groove and a shear groove, feeding capability by a feed groove and a shear groove, and stable supply and feeding capability owing to arrangement of intake grooves, of mill 2B, separately from one another.

Shear groove 350b has a shape along equiangular spiral S expressed in (Expression 1) described above, which does not pass through center of rotation C, and is in a shape extending in a direction toward the outer circumference at a constant depth. When the mill has outer shape D1 of $\phi$50 mm, 68 shear grooves 350b are most densely arranged in rotation symmetry in lower mill 350, where shear groove 350b has a width (w) of 0.8 mm and a depth (d) of 0.3 mm and angle of intersection $\beta$ (see FIG. 42) is 34° along an equiangular spiral. By increasing the number of shears, high grating capability could be obtained even with a small size of a mill.

FIG. 37 shows a shape of a shear groove in another form. Lower mill 350 shown in FIG. 37 is further provided with a branch shear groove (third groove) 350e branched from a branch portion X, in addition to shear groove 350b. Branch shear groove 350e is one of means for most densely arranging shear grooves in accordance with a diameter of a mill, and can be adopted not only in a lower mill but also in an upper mill. Though the number of grooves which can be arranged is limited due to concentration of grooves in a central portion, when a large diameter can be ensured, shear grooves can most densely be arranged by providing a plurality of branch points at points in the respective shear grooves intermediate toward the outer circumference. Further branch from a branch groove is also applicable.

Branch portion X is desirably provided in a range of $0.2 \times D1 \leq dX \leq 0.6 \times D1$, where dX represents a distance (radius) from center of rotation C of lower mill 350 to branch portion X.

When shear grooves are arranged most densely in lower mill 350 having outer diameter D1 of $\phi$50 mm, no groove can be formed in a central portion (on an inner side of dX) where shear grooves are concentrated. An object to be grated cannot be grated in a region where no groove can be formed, and such a region will be a dead space. In order to increase an effective region where shear can be provided, branch shear groove 350e is provided.

By providing branch portion X at a position of $dX=\phi24$ mm, 34 grooves can be ensured in a range of $\phi$24 mm from center of rotation C and 68 grooves can be ensured in an outer circumferential portion beyond $\phi$24 mm. In the lower mill in the present embodiment, shear grooves could efficiently be arranged and high grating capability could be realized.

Branch shear groove 350e extending from branch portion X has a shape along an equiangular spiral the same in curvature as shear groove 350b (also the same in width w, depth d of the inclined surface, and angle of inclination $\theta$), and the number of shear grooves can be increased without lowering in shear force. For example, when lower mill 350 has a large outer diameter, two or more branch portions may be provided, and grating capability can be increased by arranging more shear grooves in grinding surface 350b.

Figure 38:
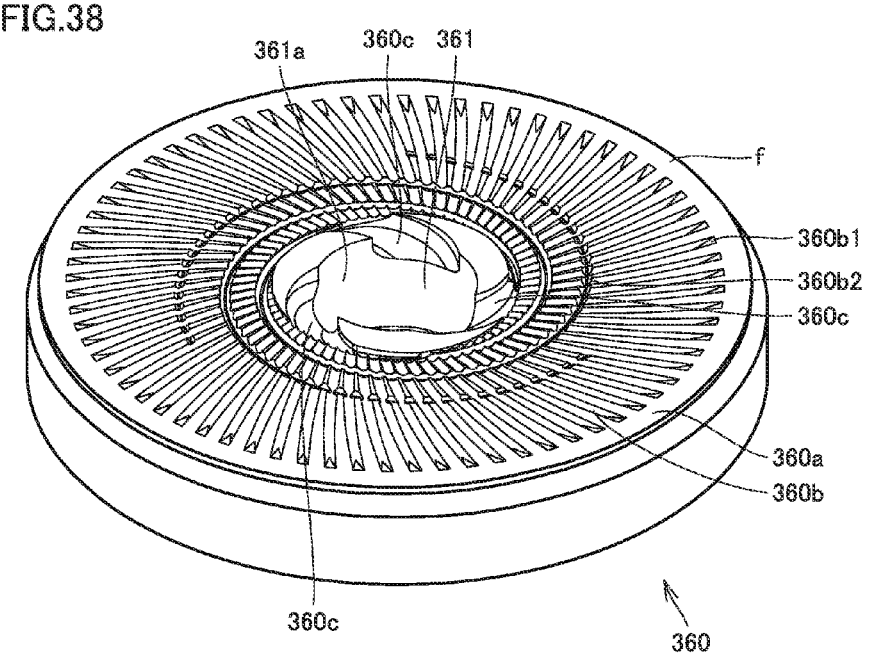
FIG. 38 is a perspective view of the upper mill in Embodiment 9.
Figure 39:
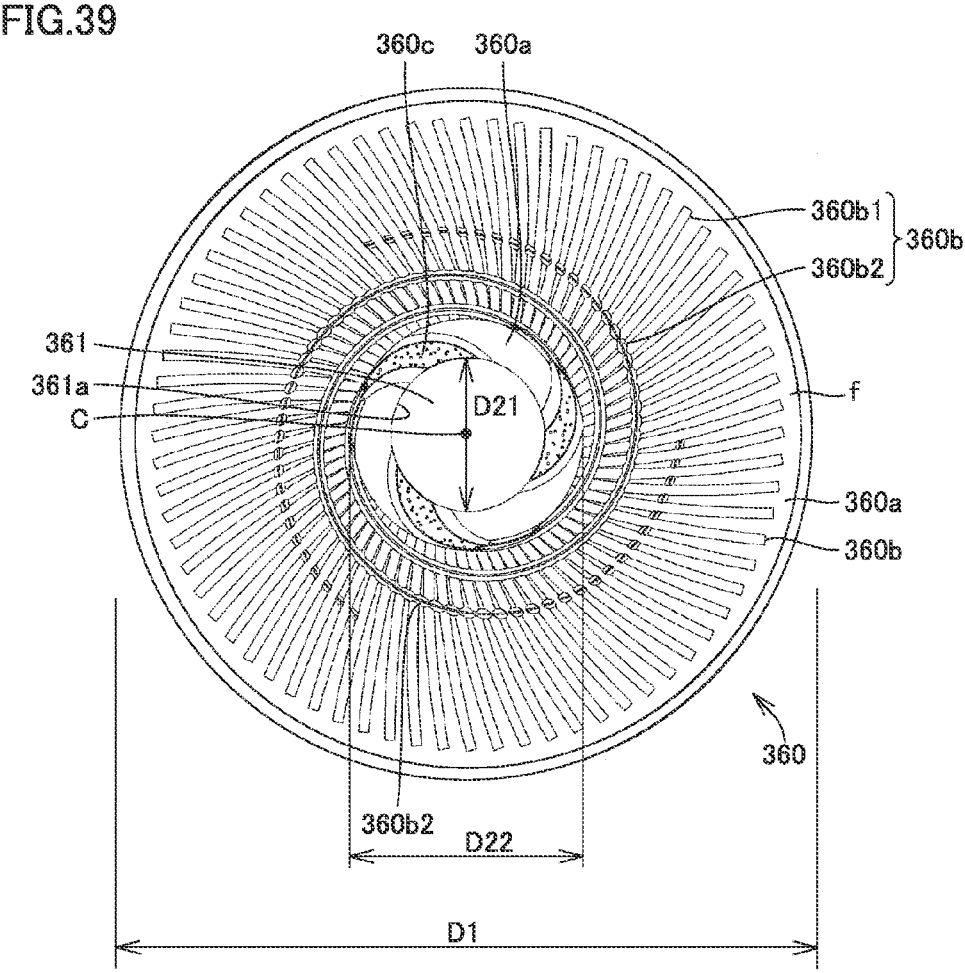
FIG. 39 is a plan view of the upper mill in Embodiment 9.
Figure 40:
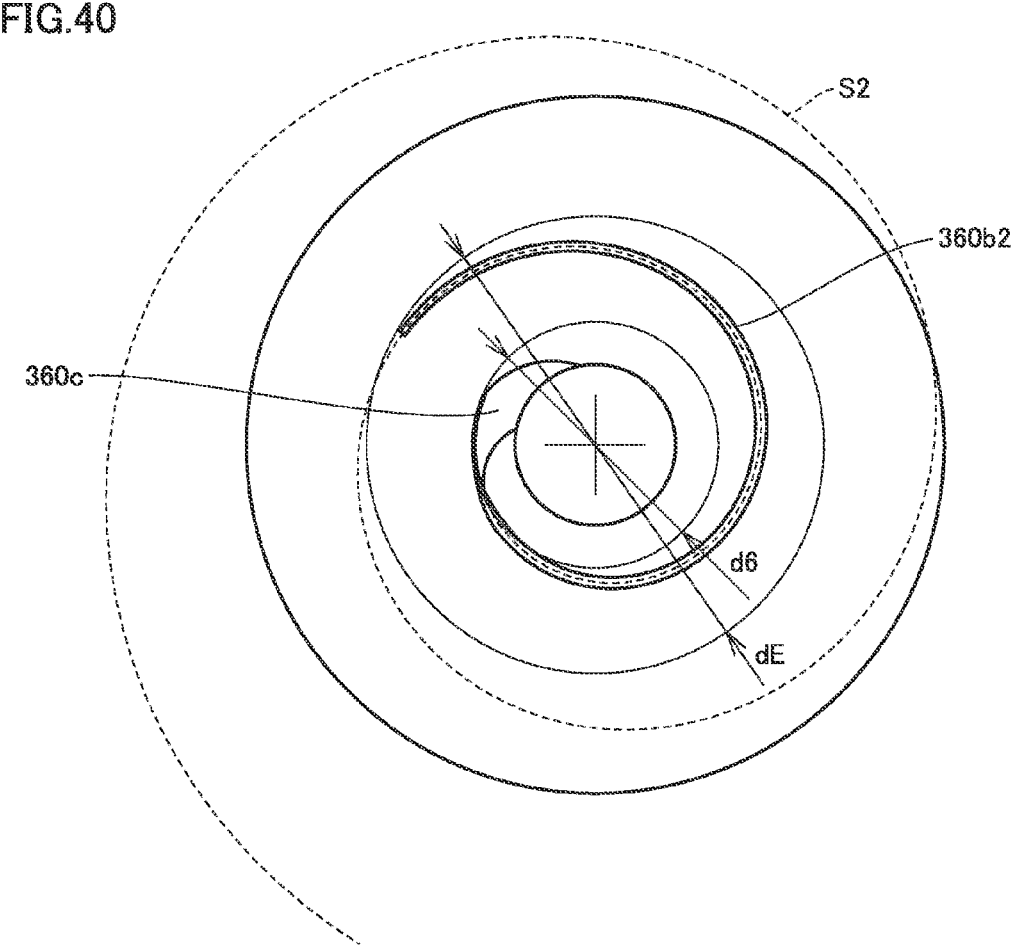
FIG. 40 is a diagram showing a range of an intake groove and a feed groove in the upper mill in Embodiment 9.

Upper mill (first mill) 360 will now be described with reference to FIGS. 38 to 40. FIG. 38 is a perspective view of upper mill 360, FIG. 39 is a plan view of upper mill 360, and FIG. 40 is a diagram showing an area of intake groove 360c and feed groove (fourth groove) 360b of upper mill 360.

Grating groove 360b and intake groove 360c are provided in grinding surface 360a of upper mill 360. Grating groove 360b includes a plurality of shear grooves (first grooves) 360b1 and three feed grooves 360b2. A plurality of shear grooves 360b1 are provided in rotation symmetry with respect to center of rotation C. Three feed grooves 360b2 are also provided in rotation symmetry with respect to center of rotation C.

Shear groove 360b1 is a groove for mainly grating an object to be grated and feed groove 360b2 is a groove for mainly feeding grated powder tea leaves (grated tea leaves) from a central portion of the mill toward the outer circumferential portion. Shear groove 360b1 and feed groove 360b2 are in a shape along an equiangular spiral.

Shear groove 360b1 has a shape along equiangular spiral S1 expressed in (Expression 1) and (Expression 2) described above, which does not pass through center of rotation C, and is in a shape extending in a direction toward the outer circumference at a constant depth. When the mill has outer shape D1 of ϕ50 mm, 72 shear grooves 360b1 are most densely arranged in rotation symmetry in upper mill 360, where width w of the groove is 0.8 mm, depth (d) is 0.3 mm, and angle of intersection β (see FIG. 42) is at 34° along an equiangular spiral. By increasing the number of times of shear, high grating capability could be obtained even with a small size of a mill.

As shown in FIG. 39, three spirally extending intake grooves 360c are provided in a region from an inner circumferential surface 361a of opening 361 of upper mill 360 toward grinding surface 360a. This intake groove 360c has a shape opening into opening (inlet port) 361 and is arranged immediately lateral to where core 355 rotates, so that an object to be grated is smoothly fed to intake groove 360c.

As shown in FIG. 40, intake groove 360c has a shape opening into opening (inlet port) 361, and extends along an equiangular spiral inclined toward an intake terminal end diameter d6. It has a shape for feeding an object to be grated into the inside while catching the object to be grated. In particular in a case that tea leaves are adopted as an object to be grated, a groove starts at a depth of 2 mm and a width of 7 mm at opening (inlet port) 361, and the groove is smoothly inclined to continue to feed groove 360b2 having a depth of 0.5 mm and a width of 0.8 mm at intake groove terminal end diameter d6 of ϕ18 mm, which is an optimal size for an object to be grated (tea leaves). Thus, the terminal end of intake groove 360c is smoothly connected to a tip end portion of feed groove 360b2, and the taken-in object to be grated can enter the grinding surfaces between upper mill 360 and lower mill 350.

Feed groove 360b2 of upper mill 360 in the present embodiment is in a shape along equiangular spiral S2 expressed in (Expression 1) and (Expression 2) described above, which does not pass through center of rotation C, and arranged in a region lying between a feed groove terminal end diameter dE and d6. Here, a condition of d6≤0.5×D1 and dE≤0.9×D1 is satisfied. Feed groove 360b2 has depth d from grinding surface 360a at terminal end diameter dE within a range of 0.1 mm≤d≤2 mm.

In particular in a case that tea leaves are adopted as an object to be grated, terminal end diameter d6 of intake groove 360c=ϕ18 mm, terminal end diameter dE of feed groove 360b2=ϕ34, and d=0.1 mm are optimal, and a groove having width (w)=0.8 mm and depth (d)=0.8 mm at the terminal end diameter of intake groove 360c is arranged to decrease in depth toward the outer circumference in a region outside a line of terminal end diameter dE of feed groove 360b2=ϕ34 mm.

Angle of inclination θ of an inclined surface (t) of feed groove 360b2 with respect to grinding surface 360a in conformity with FIGS. 17 and 18 is 0°≤θ≤4.5° and is optimal at θ=0.5°.

By arranging a plurality of intake grooves 360c and feed grooves 360b2, a speed of feeding an object to be grated can be adjusted. A time for processing can be earlier by arranging two than arranging one. In the present embodiment, when opening (inlet port) 361 has an inner diameter of ϕ12 mm, a time period for processing is optimized by arranging three intake grooves 360c and three feed grooves 360b2.

Though a case that intake groove 360c and feed groove 360b2 are provided in upper mill 360 has been described in the present embodiment, they may be arranged also in lower mill 350, and a speed of feeding an object to be grated can further be higher by adding grooves in lower mill 350.

In employing core 355 attached to lower mill 350 as in the present embodiment, intake groove 360c and feed groove 360b2 are arranged in upper mill 360 so that a wide range of shear can be ensured and setting high in efficiency in grating can be made while intake and feeding of tea leaves are increased. In addition, loss of tea leaves which remain during grating in grooves in a mill is minimized and simultaneously lower mill 350 is limited to have substantially radial grooves. Thus, ease in cleaning is also improved.

Intake groove 360c may be provided only in upper mill 360, only in lower mill 350, or in both of upper mill 360 and lower mill 350. Similarly, feed groove 360b2 may be provided only in upper mill 360, only in lower mill 350, or in both of upper mill 360 and lower mill 350.

Figure 41:
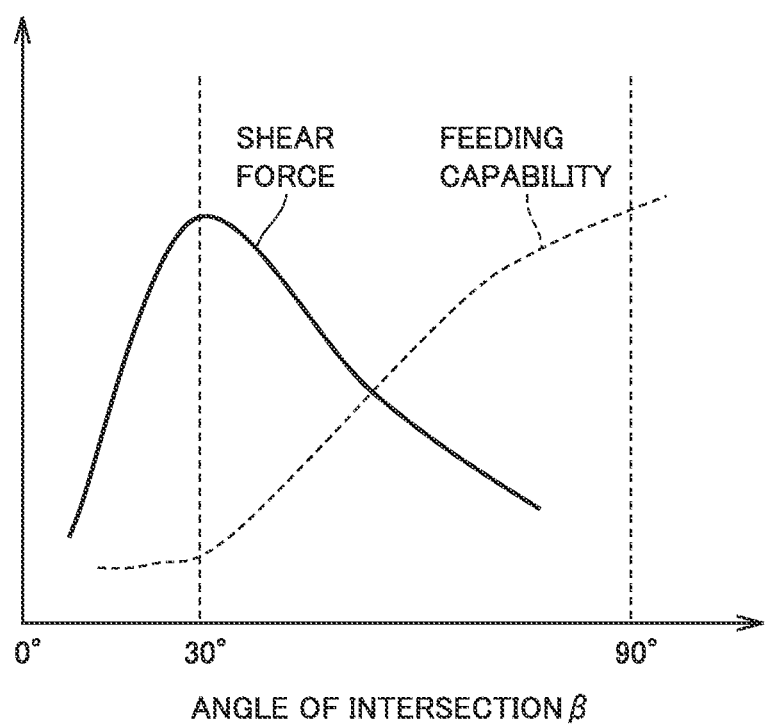
FIG. 41 is a diagram showing relation between an angle of intersection between a groove in the upper mill and a groove in the lower mill and shear force and relation between an angle of intersection between a groove in the upper mill and a groove in the lower mill and feeding capability in Embodiment 9.
Figure 42:
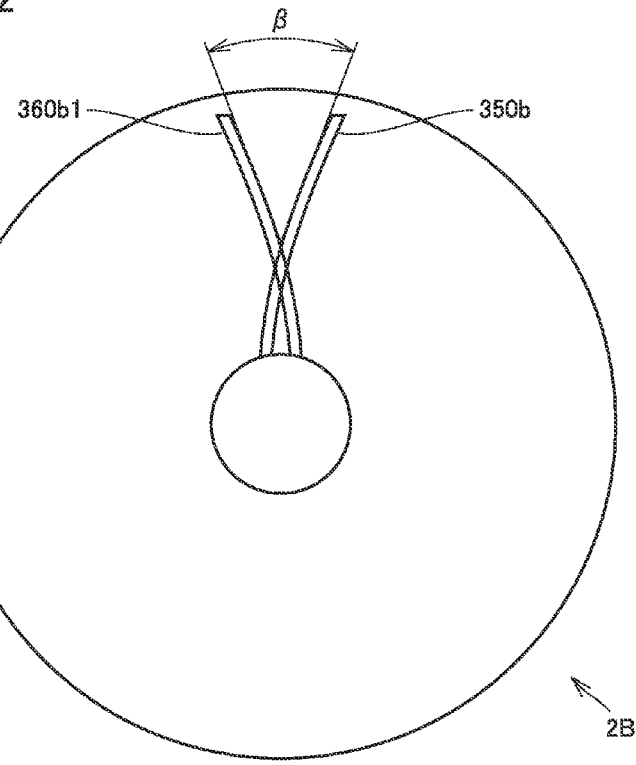
FIG. 42 is a diagram showing an angle of intersection in a mill in Embodiment 9.

Shear force applied to an object to be grated and feeding capability at an angle of intersection between a groove in the upper mill and a groove in the lower mill will be described here with reference to FIGS. 41 and 42. FIG. 41 is a diagram showing relation between an angle of intersection between a groove in the upper mill and a groove in the lower mill and shear force and relation between an angle of intersection between a groove in the upper mill and a groove in the lower mill and feeding capability, and FIG. 42 is a diagram showing an angle of intersection in a mill. As shown in FIG. 42, when two-dimensionally viewed, an angle of intersection between shear groove 360b1 of upper mill 360 and shear groove 350b of lower mill 350 is expressed with β.

As described with reference to FIGS. 5 to 10, a conventional linear shape of grooves has been adopted in the grinding surface of the mill in the background art, and it can be seen that an angle of intersection has been various, with attention being paid to an angle of intersection between the grooves in breakage of an object to be broken by making use of intersection between the grooves. Intersection between linear grooves has not necessarily been optimal because this angle of intersection varies in a range from 0° to 90° and the groove of the upper mill and the groove of the lower mill may momentarily be superimposed on each other when viewed two-dimensionally.

A greater angle of intersection between the groove of the upper mill and the groove of the lower mill results in high shear force, and an object to be grated tends to escape. It has generally been known that a smaller angle of intersection between the groove of the upper mill and the groove of the lower mill results in lower shear force and an object to be sheared is less likely to escape.

As shown in FIG. 41, it has been found in experiments that, when angle of intersection β (see FIG. 42) is set, effective shear can be achieved within a range of 10°≤β≤50° and shearing is efficient particularly at an angle of intersection around 30°. In addition, by selecting a shape along an equiangular spiral for a shear groove, always the same angle of intersection is obtained and grating can be efficient as described in the embodiments above.

In mill 2B (lower mill 350/upper mill 360) in the present embodiment, flat portion f (see FIGS. 35 and 38) where no groove is present is provided around the entire outermost circumferential edge portion of grinding surfaces 350a and 360a within a range of 0.5 mm≤w≤1.5 mm.

Shear grooves 350b and 360b1 have inclined surface t increasing in depth toward center of rotation C (in conformity with FIGS. 17 and 18), depth d from grinding surfaces 350a and 360a on the outermost circumferential side of inclined surface t is within a range of 0.1 mm≤d≤1 mm, and angle of inclination θ of inclined surface t with respect to grinding surfaces 350a and 360a is 0°≤θ≤4.5°. In the present embodiment, by setting angle of inclination θ to 0° and depth d to 0.3 mm, powders which remain in the grooves and result in loss can be decreased.

Figure 43:
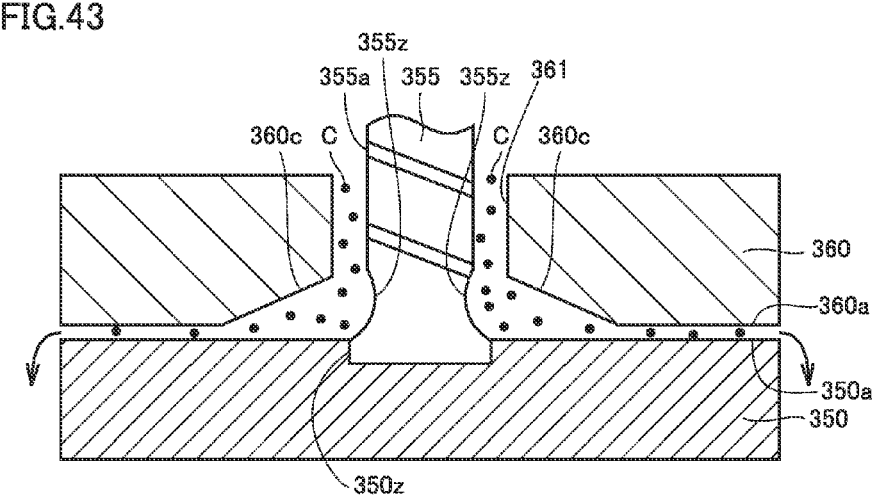
FIG. 43 is a diagram showing a schematic structure of an intake groove in Embodiment 9.

Referring to FIG. 43, a tapered region is not provided in the central portion of mill 2B (lower mill 350/upper mill 360) in the present embodiment, and the central portion is flush with grinding surfaces 350a and 360a. The construction is optimal when grinding surfaces 350a and 360a of mill 2B (lower mill 350/upper mill 360) have an outer diameter of φ50 mm, and in order to feed an object to be grated intermittently into mill 2B, core 355 is adopted. Core 355 is attached to the central portion of lower mill 350 so as to pass through hole 361 provided in the central portion of upper mill 360. Core 355 rotates with rotation of lower mill 350, and efficient feed into the inside of mill 2B along a spiral blade included in core 355 is achieved.

In order to ensure maximized grinding surfaces 350a and 360a, such a shape that opening (inlet port) 361 for an object to be grated in the central portion of upper mill 360 is minimized is desirable. When tea leaves are adopted as an object to be grated, tea leaves can efficiently be taken in by setting an inner diameter of opening (inlet port) 361 to φ12 mm and setting an outer diameter of core 355 and an inner diameter of a central attachment portion 350z of lower mill 350 to φ10 mm.

A construction of the upper mill and the construction of the lower mill can also be interchanged in the construction of a mill in each embodiment above.

(Embodiment 10)

Figure 44:
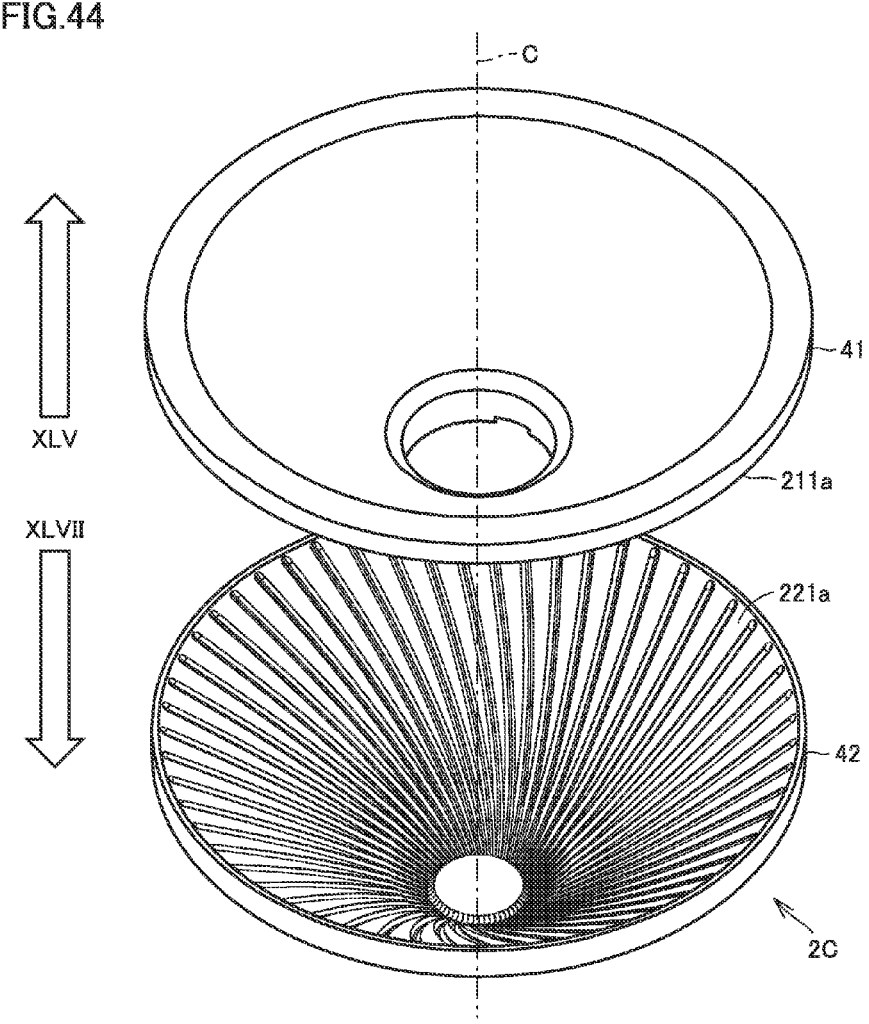
FIG. 44 is an overall view showing a structure of a mill in Embodiment 10.

A shape of a mill is not limited to a disk shape shown in each embodiment. For example, a mill in a mortar shape as shown in FIG. 44 may be adopted in Embodiment 10. A mill 2C in a mortar shape in the present embodiment will be described with reference to FIGS. 44 to 52.

Figure 45:
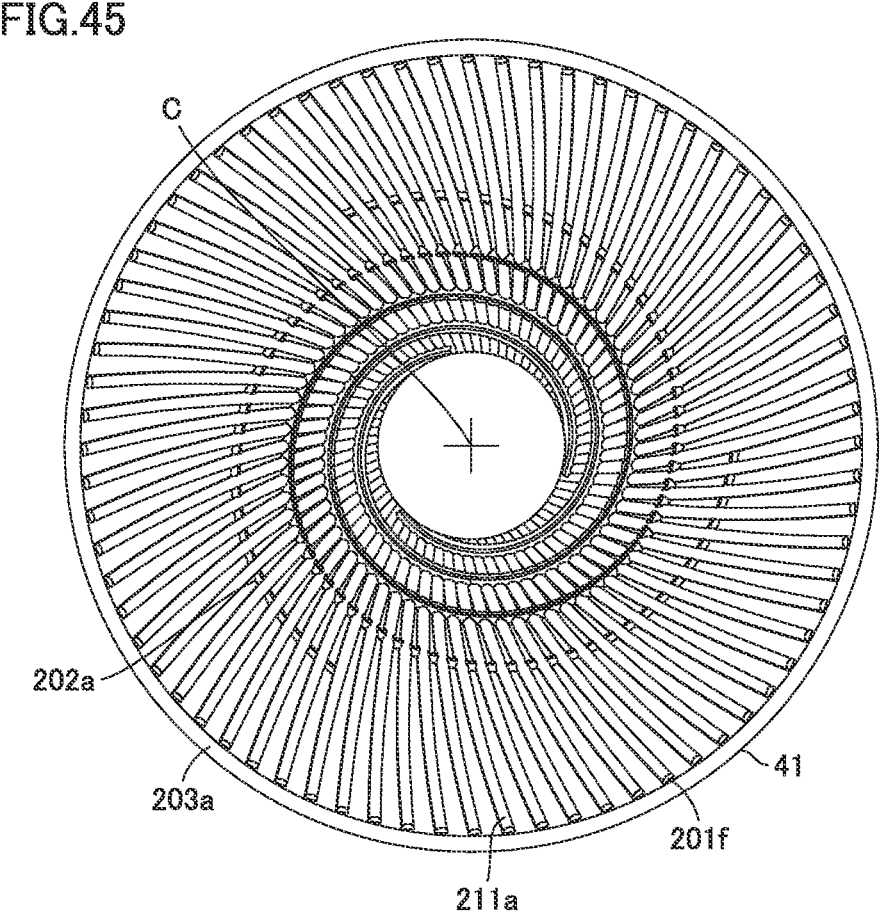
FIG. 45 is a diagram showing a shape of grooves provided in a grinding surface of an upper mill in Embodiment 10.
Figure 46:
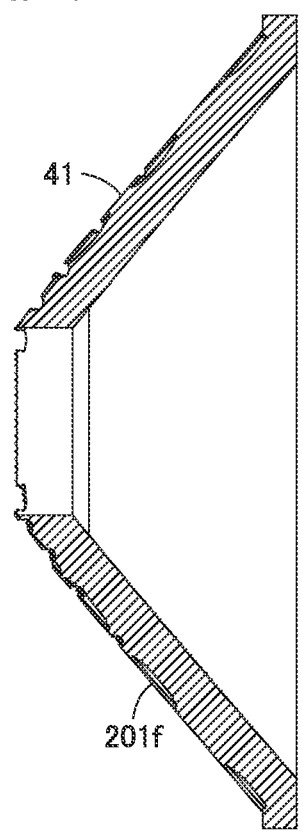
FIG. 46 is a cross-sectional view along an axis of rotation at a center of rotation of the upper mill in Embodiment 10.
Figure 47:
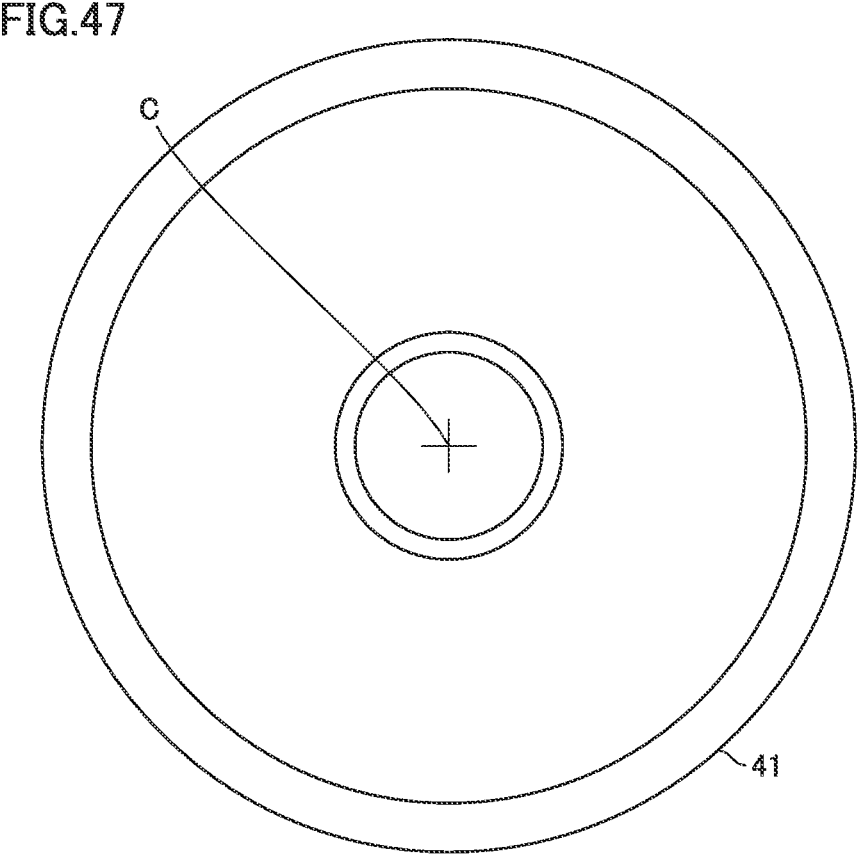
FIG. 47 is a diagram of the upper mill in Embodiment 10 viewed along a direction shown with an arrow XLVII in FIG. 44.
Figure 48:
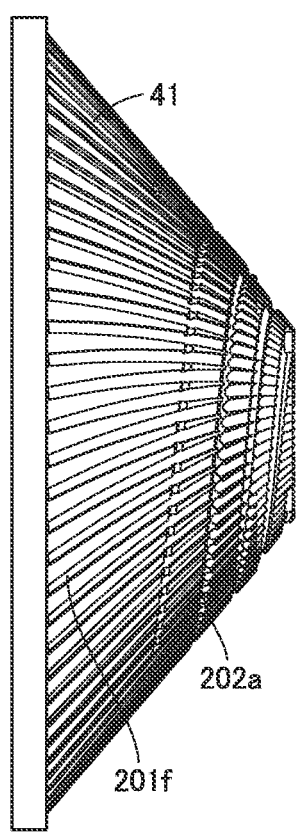
FIG. 48 is a side view of the upper mill in Embodiment 10 viewed from an outer side.

FIG. 44 is an overall view showing a structure of mill 2C, and FIG. 45 is a diagram showing a shape of grooves provided in a grinding surface of an upper mill 41, viewed along a direction shown with an arrow XLV in FIG. 44 (view from below). FIG. 46 is a cross-sectional view along an axis of rotation C at center of rotation C of upper mill 41, FIG. 47 is a diagram of upper mill 41 viewed along a direction shown with an arrow XLVII in FIG. 44 (view from above), and FIG. 48 is a side view of upper mill 41 viewed from an outer side.

Figure 49:
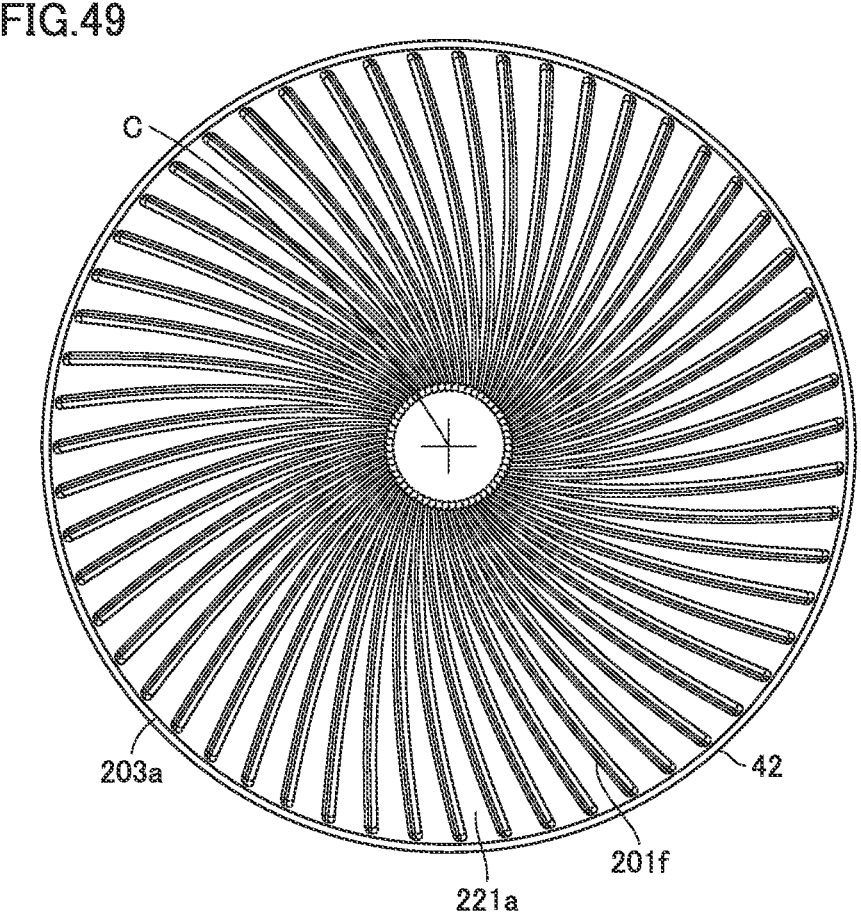
FIG. 49 is a diagram showing a shape of grooves provided in a grinding surface of a lower mill in Embodiment 10.
Figure 50:
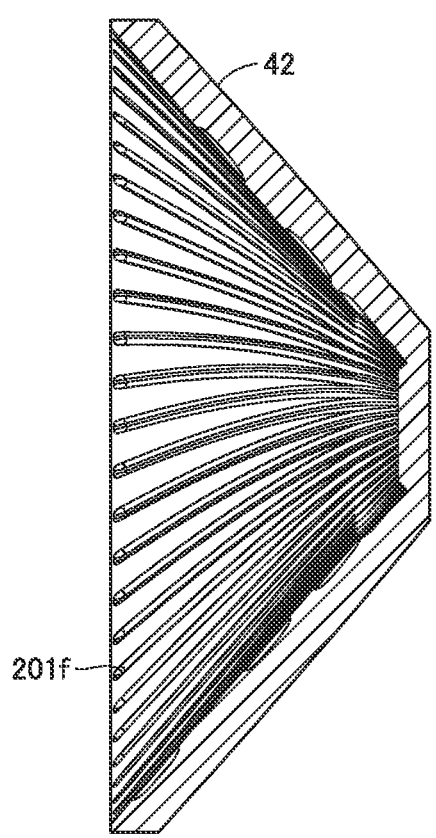
FIG. 50 is a cross-sectional view along an axis of rotation at a center of rotation of the lower mill in Embodiment 10.
Figure 51:
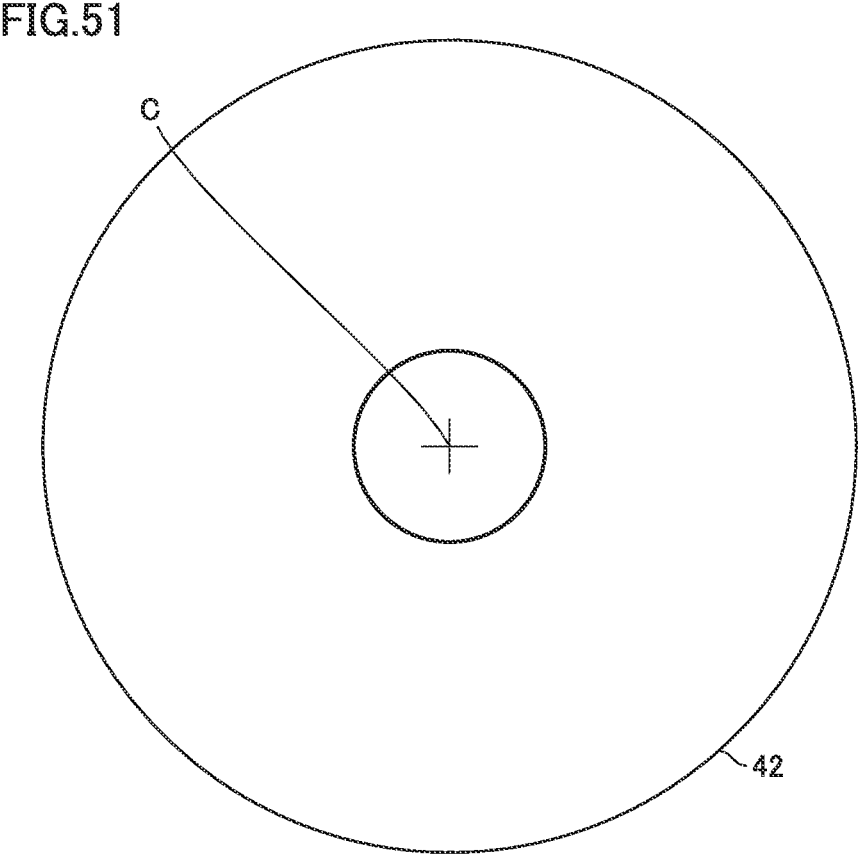
FIG. 51 is a diagram of the lower mill in Embodiment 10 viewed along the direction shown with the arrow XLVII in FIG. 44.
Figure 52:
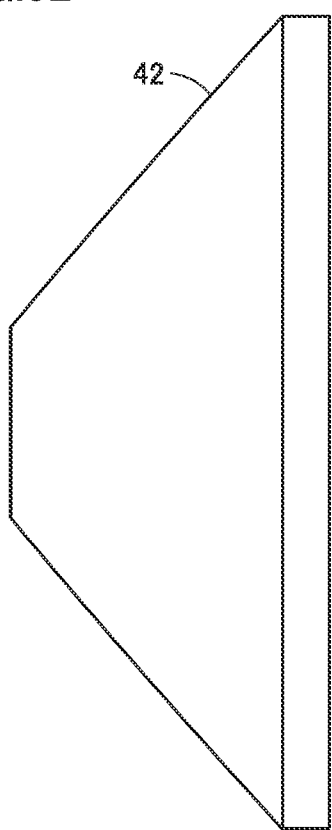
FIG. 52 is a side view of the lower mill in Embodiment 10 viewed from the outer side.

FIG. 49 is a diagram showing a shape of grooves provided in a grinding surface of a lower mill 42, viewed along the direction shown with arrow XLVII in FIG. 44 (view from below). FIG. 50 is a cross-sectional view along the axis of rotation at center of rotation C of lower mill 42, FIG. 51 is a diagram of lower mill 42 viewed along a direction shown with the arrow XLV in FIG. 44, and FIG. 52 is a side view of lower mill 42 viewed from the outer side.

Referring to FIG. 44, mill 2C in the present embodiment includes upper mill 41 provided with a grinding surface 211a and lower mill 42 provided with a grinding surface 221a. Both of upper mill 41 and lower mill 42 have a shape of a mortar. Center of rotation C is defined in a central portion of upper mill 41 and lower mill 42.

Referring to FIGS. 45 and 46, a planar portion 203a, a shear groove 201f, and a feed groove 202a are formed in grinding surface 211a of upper mill 41. Referring to FIGS. 49 and 50, planar portion 203 and shear groove 201f are formed in grinding surface 221a of lower mill 42. Though no feed groove is formed in lower mill 42, a feed groove may be added similarly to upper mill 41. By adding a feed groove also in lower mill 42, feeding of tea leaves can be earlier.

Grinding surface 211a of upper mill 41 and grinding surface 221a of lower mill 42 are arranged to face each other, so that a groove provided in grinding surface 211a of upper mill 41 and a groove provided in grinding surface 221a of lower mill 42 are in relation of arrangement of point symmetry with respect to center of rotation C when viewed along the direction shown with arrow XLVII in FIG. 44.

A plurality of shear grooves 201f are provided in rotation symmetry with respect to center of rotation C. Shear groove 201f is a groove for mainly grating an object to be grated and feed groove 202a is a groove for mainly feeding grated powders from the central portion of mill 2C to the outer circumferential portion.

Referring again to FIG. 44, grinding surface 221a of lower mill 42 and grinding surface 211a of upper mill 41 abut to each other and rotate relatively to each other with center of rotation C being defined as the center of the axis of rotation. As shown in the present embodiment, by shaping a mill like a mortar, a shear groove longer than in a mill in a disk shape can be arranged and high grating capability can be realized.

(Embodiment 11: Milling Unit 300)

Figure 53:
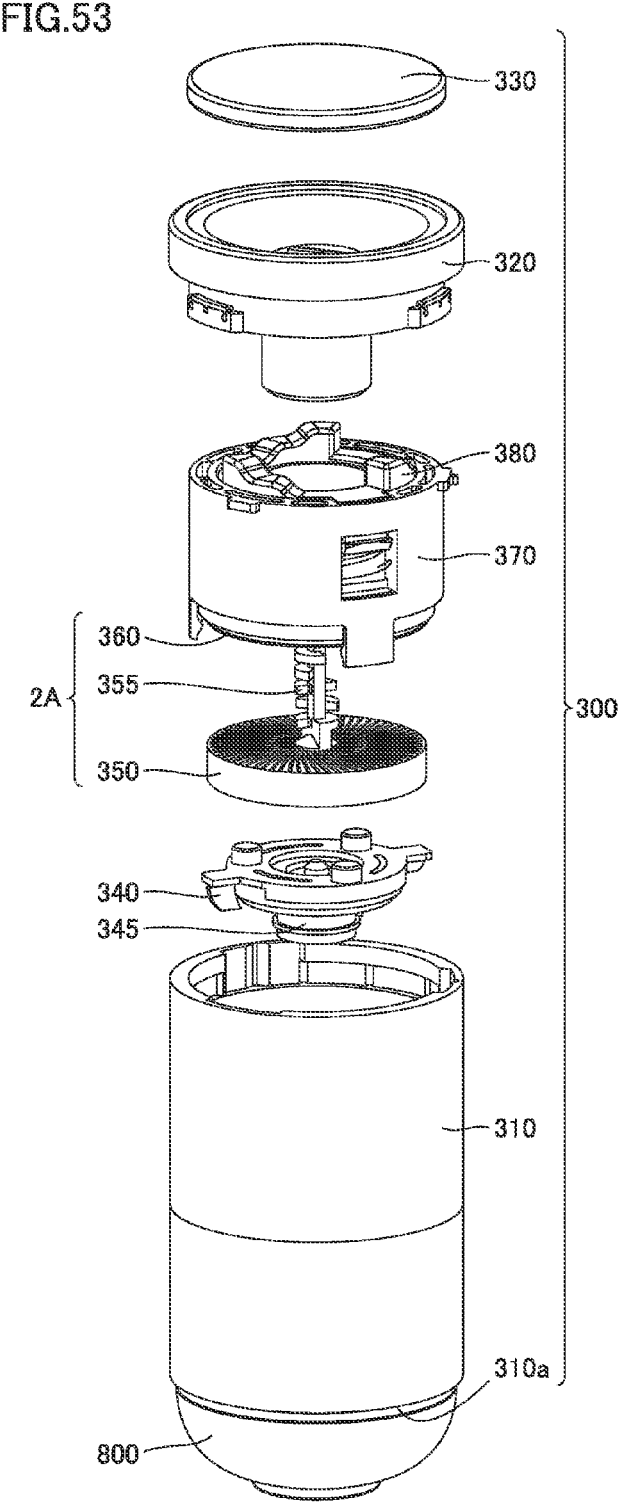
FIG. 53 is an exploded perspective view showing a structure of a milling machine in Embodiment 11.
Figure 54:
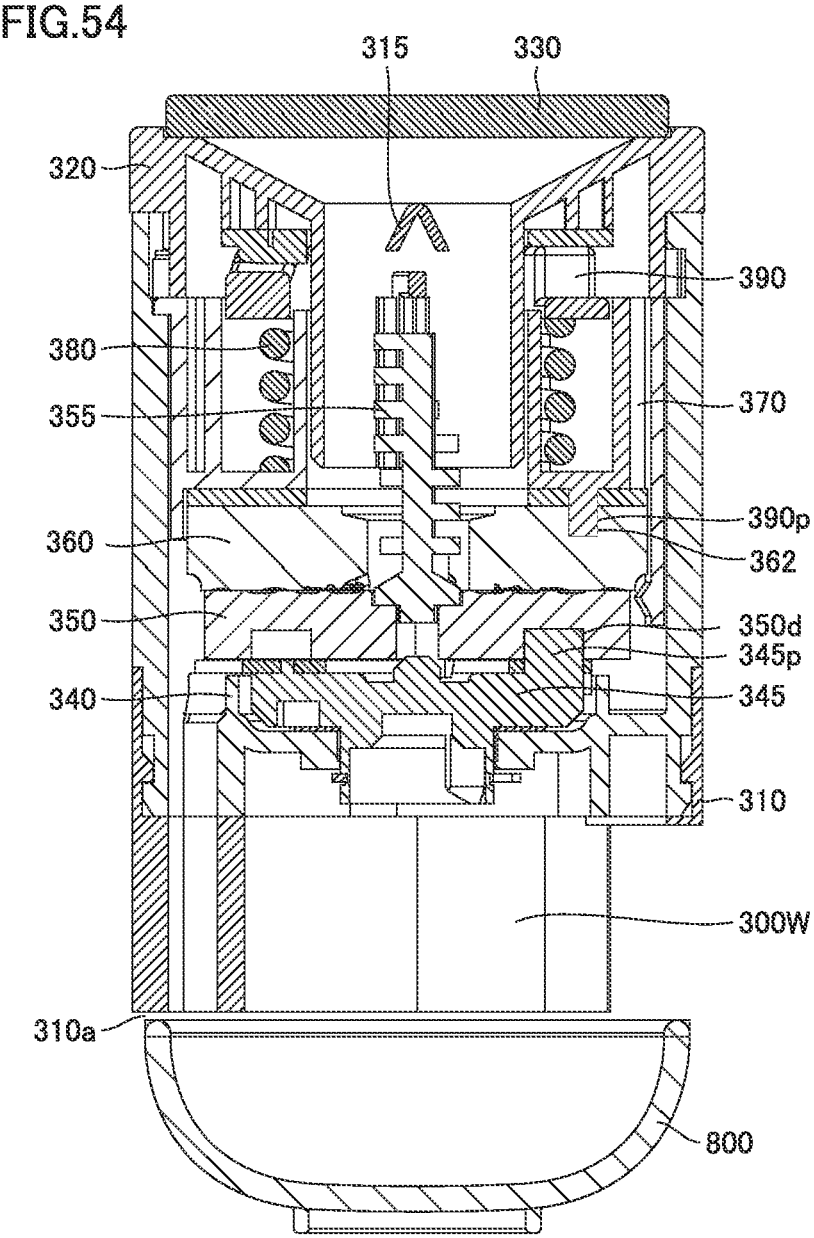
FIG. 54 is a vertical cross-sectional view showing the structure of the milling machine in Embodiment 11.

A structure of a milling unit 300 as a milling apparatus including mill 2B will now be described with reference to FIGS. 53 and 54. FIG. 53 is an exploded perspective view of milling unit 300 and FIG. 54 is a vertical cross-sectional view of milling unit 300.

Milling unit 300 has a milling case 310 having a cylindrical shape as a whole, and a window 310w for coupling in which an externally provided milling driving force coupling mechanism is inserted is provided in a side surface below. An outlet port 310a is formed at a lowermost end portion of milling case 310 from which powders of tea leaves grated by milling unit 300 are taken out (drop).

A powder scraper 340, lower mill 350, and upper mill 360 are sequentially provided from below, in the inside of milling case 310. A milling shaft 345 extending downward is provided on a lower surface of powder scraper 340 and coupled to the milling driving force coupling mechanism to thereby rotationally drive lower mill 350.

Core 355 extending upward along a core of the axis of rotation is provided in the central portion of lower mill 350. Upper mill 360 is held by an upper mill holding member 370, and a spring 380 and a spring holding member 390 pressing upper mill 360 downward are accommodated in upper mill holding member 370. Lower mill 350 and upper mill 360 are in contact with each other at grinding surface 350a of lower mill 350 and grinding surface 360a of upper mill 360. Core 355 is placed in lower mill 350 and protrudes upward from upper mill 360 through opening 361 in upper mill 360.

Referring to FIG. 54, upper mill 360 has a hole with bottom 362 in which rotation stop pin 390p is inserted and held by upper mill holding member 370 so as not to rotate. A plurality of holes with bottom 350d in which rotational drive pins 345p provided in milling shaft 345 are introduced, respectively, are provided in a rear surface of lower mill 350.

As milling shaft 345 is coupled to the externally provided milling driving force coupling mechanism, lower mill 350 and core 355 rotate. Thus, an object to be grated such as tea leaves introduced from above milling unit 300 is sequentially fed downward from above with rotation of core 355, and the object to be grated can efficiently be taken into mill 2B as shown in FIG. 43.

The mill, a milling machine, and the beverage preparation apparatus in the present embodiment above can provide a mill including a shape of grooves allowing reduction in size of a mill, a milling machine including the mill, and a beverage preparation apparatus including the milling machine.

Though a case that a motor is used for rotationally driving a shaft in the milling machine in each embodiment above is described, the shaft may manually be rotationally driven, without being limited to a case of use of an electrically powered drive apparatus such as a motor.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 2, 2A, 2A', 2B, 2C, 21D mill; 3 dispensing portion; 4 tank; 5 heater; 6 agitation blade; 8 agitation tank; 9 cup; 11 motor; 12 agitation motor; 21, 21d, 41 upper mill; 21A first-stage mill; 21B second-stage mill; 21C third-stage mill; 21a first upper mill; 21b second upper mill; 21c third upper mill; 22, 22A, 22A', 22A" lower mill; 22a first lower mill; 22b second lower mill; 22c third lower mill; 22d intermediate mill; 23d, 42 lower mill; 71, 72 electromagnetic valve; 100 gear box; 101 fixing rib; 102 fixing screw; 103 blade; 103a rotation plate; 103b leveling plate; 103c key block; 103d shaft core hole; 111 shaft; 150 inlet port; 201, 201d,201d', 201f shear groove (first groove); 201e recess portion; 202, 202a feed groove (fourth groove); 203, 203a planar portion; 204 hole; 211, 211a grinding surface; 111 shaft; 111K key; 150A, 150B, 150C inlet port; 201a shear groove; 201b branch groove; 201c bridging groove; 202 feed groove; 203 planar portion; 210 first gear; 213 motor gear; 220 second gear; 221 grinding surface; 250 housing; 250r rotation stop rib; 234 supply groove; 300 milling unit; 310 milling case; 310a outlet port; 310w window for coupling; 340 powder scraper; 345 milling shaft; 345p rotational drive pin; 350 lower mill; 350a grinding surface; 350b shear groove (grating groove: second groove); 350d hole with bottom; 350c center hole; 350d hole with bottom; 350e branch shear groove (third groove); 350z attachment portion; 355 core; 360 upper mill; 360a grinding surface; 360b grating groove; 360b1 shear groove (first groove); 360b2 feed groove (fourth groove); 360c intake groove; 361 opening (inlet port); 361a inner circumferential surface; 362 hole with bottom; 370 upper mill holding member; 380 pressing spring; 390 spring holding member; 390p rotation stop pin; 1000 milling machine; 2000 beverage preparation apparatus; and C center of rotation.

The invention claimed is:

1. A mill, comprising:
a first mill provided with a first grinding surface; and
a second mill provided with a second grinding surface,
the first grinding surface including a first groove in a curved shape which extends from a side of a center of rotation toward an outer circumference,
the second grinding surface including a second groove in a curved shape which extend from the side of the center of rotation toward the outer circumference, and
the first groove and the second groove not being completely superimposed on each other and an angle of intersection β between the first groove and the second groove being $10° \leq β \leq 50°$ while the first grinding surface and the second grinding surface are superimposed on each other.

2. The mill according to claim 1, wherein
the first groove has a shape extending along an equiangular spiral and an angle α1 formed between a half line extending from the center of rotation and the first groove is $0° < α1 < 45°$, and
the second groove has a shape extending along an equiangular spiral and angle α1 formed between the half line extending from the center of rotation and the second groove is $0° < α1 < 45°$.

3. The mill according to claim 1, wherein
a plurality of second grooves are provided in rotation symmetry with respect to the center of rotation,
the plurality of second grooves further includes one branch portion or a plurality of branch portions and a third groove extending from the branch portion toward an outer circumferential portion, and
the third groove extending from the branch portion toward the outer circumferential portion is arranged in rotation symmetry between the plurality of second grooves and curved in a direction the same as the plurality of second grooves.

4. The mill according to claim 3, wherein
the third groove is provided with the branch portion at a position satisfying $0.2 \times D1 \leq dX \leq 0.6 \times D1$, where D1 represents an outer diameter of the second mill and dX represents a distance from the center of rotation to the branch portion.

5. The mill according to claim 1, wherein
the first mill and/or the second mill further include(s) a plurality of fourth grooves provided in rotation symmetry with respect to the center of rotation, and
an angle α2 formed between the half line extending from the center of rotation and the fourth groove is $45° < α2 < 90°$.

6. The mill according to claim 5, wherein
the first mill and/or the second mill further include(s) a side surface in a cylindrical shape which defines in a central portion, an inlet port through which an object to be grated is introduced, and an intake groove opening into the grinding surface from the side surface,
a plurality of intake grooves are provided in rotation symmetry with respect to the center of rotation,
each of the plurality of intake grooves has an inclined surface increasing in depth toward the center of rotation, and
each of the plurality of intake grooves corresponds to the fourth groove in number and has a terminal end coinciding with a starting point of the fourth groove.

7. The mill according to claim 6, wherein
a condition of $d6 \leq 0.5 \times D1$ and $dE \leq 0.9 \times D1$ is satisfied, where D1 represents an outer diameter of the first mill, d6 represents a diameter of the terminal end of each of the plurality of intake grooves, and dE represents a diameter of the terminal end of the fourth groove,
each of the plurality of intake grooves is arranged in a region lying between the side surface and d6, and
the fourth groove is arranged in a region lying between the side surface and the diameter of the terminal end of the fourth groove.

8. The mill according to claim 5, wherein
a flat portion where no first groove is present is provided around an entire circumference of an outermost circumferential portion of the first grinding surface, a flat portion where no second groove is present is provided around an entire circumference of an outermost circumferential portion of the second grinding surface, a width w of the fourth groove along a direction orthogonal to a direction of extension of the fourth groove is within a range of 0.3 mm≤w≤1.5 mm, the fourth groove has an inclined surface increasing in depth toward the center of rotation, a depth d from the first grinding surface at the terminal end of the fourth groove is within a range of 0.1 mm≤d≤2 mm, and an angle of inclination Θ of the inclined surface with respect to the first grinding surface is within a range of 0°≤Θ≤4.5°.

9. The mill according to claim 3, wherein the first groove has a width w along a direction orthogonal to a direction of extension of the first groove within a range of 0.3 mm≤w≤1.5 mm, has an inclined surface increasing in depth toward the center of rotation, has a depth d from the first grinding surface on an outermost circumferential side of the inclined surface within a range of 0.1 mm≤d≤1 mm, and has an angle of inclination Θ of the inclined surface with respect to the first grinding surface of 0°≤Θ≤4.5°, the second groove has width w along a direction orthogonal to a direction of extension of the second groove within a range of 0.3 mm≤w≤1.5 mm, has an inclined surface increasing in depth toward the center of rotation, has depth d from the second grinding surface on the outermost circumferential side of the inclined surface within a range of 0.1 mm≤d≤1 mm, and has angle of inclination Θ of the inclined surface with respect to the second grinding surface of 0°≤Θ≤4.5°, and the third groove has width w along a direction orthogonal to a direction of extension of the third groove within a range of 0.3 mm≤w≤1.5 mm, has an inclined surface increasing in depth toward the center of rotation, and has depth d from the second grinding surface on the outermost circumferential side of the inclined surface within a range of 0.1 mm≤d≤1 mm.

10. A mill, comprising a first mill and a second mill each provided with a grinding surface, the grinding surface of each of the first mill and the second mill including at least one groove extending from a center of rotation of the grinding surface toward an outer circumference of the grinding surface, and the at least one groove having a shape extending along an equiangular spiral, wherein the at least one groove is provided in rotation symmetry with respect to the center of rotation, and an angle α2 formed between a half line extending from the center of rotation and the at least one groove is 45°<α2<90°.

11. The mill according to claim 10, wherein the at least one groove includes a plurality of first grooves provided in rotation symmetry with respect to the center of rotation, and an angle α1 formed between the half line extending from the center of rotation and the plurality of first grooves is 0°<α1<45°.

12. The mill according to claim 11, wherein a flat portion, where none of the plurality of first grooves is present, is provided around an entire circumference of an outermost circumferential edge portion of the grinding surface, a width w along a direction orthogonal to a direction of extension of the plurality of first grooves is within a range of 0.5 mm≤w≤1.5 mm, the plurality of first grooves have an inclined surface increasing in depth toward the center of rotation, a depth d from the grinding surface on an outermost circumferential side of the inclined surface is within a range of 0.1 mm≤d≤1 mm, and an angle of inclination Θ of the inclined surface with respect to the grinding surface is 2.3°≤Θ≤4.5°.

13. A beverage preparation apparatus for preparing beverages with powders, comprising:

a milling machine for obtaining the powders by grating an object to be grated;

a tank for storing a liquid; and an agitation tank supplied with the powders obtained by the milling machine and the liquid, for mixing the powders and the liquid, the milling machine including the mill according to claim 1.

* * * * *